US012517509B2

(12) United States Patent
Liu et al.

(10) Patent No.: US 12,517,509 B2
(45) Date of Patent: Jan. 6, 2026

(54) REMOTE OPERATION OF ROBOTIC SYSTEMS

(71) Applicant: Extend Robotics Limited, London (GB)

(72) Inventors: Chang Liu, Stanmore (GB); Bartosz Meglicki, Stanmore (GB)

(73) Assignee: EXTEND ROBOTICS LIMITED, Sanmore (GB)

( * ) Notice: Subject to any disclaimer, the term of this patent is extended or adjusted under 35 U.S.C. 154(b) by 207 days.

(21) Appl. No.: 18/043,253

(22) PCT Filed: Aug. 27, 2021

(86) PCT No.: PCT/EP2021/073760
§ 371 (c)(1),
(2) Date: Feb. 27, 2023

(87) PCT Pub. No.: WO2022/043504
PCT Pub. Date: Mar. 3, 2022

(65) Prior Publication Data
US 2023/0341851 A1 Oct. 26, 2023

(30) Foreign Application Priority Data
Aug. 27, 2020 (GB) .................................. 2013444

(51) Int. Cl.
*G05D 1/00* (2024.01)
*B25J 9/16* (2006.01)
(Continued)

(52) U.S. Cl.
CPC ............ *G05D 1/0044* (2013.01); *B25J 9/162* (2013.01); *B25J 9/1689* (2013.01); *B64D 1/22* (2013.01);
(Continued)

(58) Field of Classification Search
None
See application file for complete search history.

(56) References Cited

U.S. PATENT DOCUMENTS 10,535,195 B2 * 1/2020 Seiler ..................... B64C 27/008
10,551,834 B2 * 2/2020 Lee ....................... G05D 1/0202
(Continued)

FOREIGN PATENT DOCUMENTS

CN 109283955 A 1/2019
CN 110060351 A 7/2019
(Continued)

OTHER PUBLICATIONS

Wu et al., "Aerial Grasping Based on VR Perception and Haptic Control," IEEE International Conference on Real-time Computing and Robotics (RCAR), Aug. 2018, pp. 556-562. (Year: 2018).*
(Continued)

*Primary Examiner* — Todd Melton
(74) *Attorney, Agent, or Firm* — Conley Rose, P.C.; Jonathan K. Polk

(57) ABSTRACT

A computer-implemented method for controlling the operation of at least one robotic system, the method comprising: receiving state information from at least one robotic system in an environment, the state information created by the at least one robotic system; processing the state information to generate a virtual robotic system model of at least part of the at least one robotic system in the environment; causing a visualisation of the virtual robotic system model to be displayed to at least one user; receiving a user instruction for performing an operation while the visualisation is being displayed to the at least one user; and issuing a command based on the received user instruction to the at least one robotic system to cause the at least one robotic system to perform the operation.

20 Claims, 11 Drawing Sheets

(51) Int. Cl.
  *B64D 1/22* (2006.01)
  *G05D 1/224* (2024.01)
  *G05D 1/46* (2024.01)
(52) U.S. Cl.
  CPC .......... *G05D 1/101* (2013.01); *G05D 1/2245* (2024.01); *G05D 1/46* (2024.01)

(56) References Cited

U.S. PATENT DOCUMENTS

| | | | |
|---|---|---|---|
| 10,913,154 B2* | 2/2021 | Tan | G05D 1/0044 |
| 11,762,369 B2* | 9/2023 | Edwards | B25J 9/1671 |
| | | | 700/3 |
| 2016/0257000 A1 | 9/2016 | Guerin et al. | |
| 2017/0323487 A1 | 11/2017 | Parente Da Silva | |
| 2019/0094863 A1 | 3/2019 | Silva et al. | |
| 2019/0135300 A1 | 5/2019 | Aguirre et al. | |
| 2019/0156520 A1 | 5/2019 | Mammou et al. | |
| 2019/0202053 A1 | 7/2019 | Tan et al. | |
| 2019/0384286 A1 | 12/2019 | Meunster et al. | |
| 2020/0111011 A1 | 4/2020 | Viswanathan | |
| 2020/0111236 A1 | 4/2020 | Tourapis et al. | |

FOREIGN PATENT DOCUMENTS

| | | |
|---|---|---|
| JP | 2002152776 A | 5/2022 |
| KR | 1020150089364 A | 8/2015 |
| WO | 2017020808 A1 | 2/2017 |
| WO | 2018200337 A1 | 11/2018 |
| WO | 2020123686 A1 | 6/2020 |

OTHER PUBLICATIONS

Yuan et al., "Human Gaze-Driven Spatial Tasking of an Autonomous MAV," IEEE Robotics and Automation Letters, vol. 4, No. 2, Apr. 2019, pp. 1343-1350. (Year: 2019).*
Yashin et al., "AeroVR: Virtual Reality-based Teleoperation with Tactile Feedback for Aerial Manipulation," 19th International Conference on Advanced Robotics (ICAR), Dec. 2019, pp. 767-772. (Year: 2019).*
Communication pursuant to Article 94(3) EPC, European Patent Office, 5 pages, Feb. 26, 2024.
Tikanmaki et al., "The Remote Operation and Environment Reconstruction of Outdoor Mobile Robots Using Virtual Reality", Aug. 2017, 6 pages.
Combined Search and Examination Report under Sections 17 & 18(3), 2 pages, United Kingdom Intellectual Property Office, Apr. 17, 2023.
European Examination Report from European Patent Application No. 21766484.6 dated Oct. 9, 2024, 5 pages.
Combined Search and Examination Report under Sections 17 & 18(3), 6 pages, United Kingdom Intellectual Property Office, Oct. 26, 2020.
Search Report under Sections 17(6), 4 pages, United Kingdom Intellectual Property Office, Mar. 11, 2021.
Examination Report under Sections 18(3), 3 pages, United Kingdom Intellectual Property Office, Apr. 1, 2021.
Intention to Grant under Section 18(4), 2 pages, Feb. 3, 2023.
Combined Search and Examination Report under Sections 17 & 18(3), 7 pages, United Kingdom Intellectual Property Office, Feb. 25, 2022.
Search Report under Sections 17(6), 3 pages, United Kingdom Intellectual Property Office, Sep. 16, 2022.
Intention to Grant under Section 18(4), 2 pages, Dec. 14, 2022.
Extended European Search Report, dated Oct. 31, 2025, 10 pages.

* cited by examiner

REMOTE OPERATION OF ROBOTIC SYSTEMS

This disclosure relates generally to a system for teleoperation of a robotic system, and in particular to an intuitive teleoperation system for a robotic system.

BACKGROUND

Robots and robotic systems are useful tools that can be used to perform a wide range of different operations. Some robotic systems can be teleoperated, meaning that the operation of the robotic systems can be controlled from a distance. One known telerobotic interface is a monitor-mouse-keyboard interface, however the capabilities of such interfaces is limited. More recent interfaces include virtual reality interfaces that display real-time video. Teleoperated robots exist such as a Toyota T-HR3 Humanoid Robot that can be controlled remotely via an exoskeleton base station. Teleoperated robotic systems have known uses in, for example, medicine where they are used to perform minimally invasive surgeries.

SUMMARY

An invention is set out in the claims.

The inventors have established that known systems do not provide a virtual reality (VR) based intuitive and immersive human interface that allows robotic systems to have a human-level of dexterity. Furthermore, known systems do not allow global teleoperation or multiuser-multirobot access. Furthermore, known systems are not optimised for automating complicated tasks. Furthermore, known systems have no or limited mobility and are not agile or well suited to performing tasks in challenging locations. The present disclosure seeks to address some or all of these and/or other disadvantages encountered in the prior art by providing an improved robotic system and human-machine interface with machine learning capabilities.

By providing a system according to the present disclosure, a number of benefits can be provided. The robotic system, remote terminal and operator interface disclosed herein provide means for improving the accuracy and/or reliability with which a complex range of operations may be completed. The robotic system transmitting a full 3D representation of its surrounding world gives the user a near real-world immersive experience. The system provides an accurate sense of depth and the flexibility to visualize the world from any perspective. This system provides an exceptionally intuitive and accurate teleoperation solution. Furthermore, the system can utilize a hand tracking interface comprising off the shelf VR equipment whilst allowing intuitive control from a user to send commands with six or more degrees of freedom for each hand. This provides the ability to achieve a high level of complexity of user input using simpler and low cost equipment. By enabling operations to be performed remotely, the safety with which the operations can be performed can be increased. By providing a robotic system that is extremely agile, a wider range of operations can be completed, and these may be completed in less time than they would be if they were performed by a human directly.

Furthermore, additional aspects disclosed herein provide a number of additional benefits. For example, mobility is enhanced for a robotic system with manipulation capability to perform an operation such as a physical interaction with the environment of the robotic system. In some examples, operations can be performed using a robotic system and/or manipulation system with at least six degrees of freedom (DoF). In some examples, using immersive technology such as VR when sending commands to the mechanical system enables them to perform manipulation tasks intuitively and at high dexterity.

The disclosure provides a method for controlling the operation of a robotic system using an operator interface, the method comprising: receiving state information from the robotic system, the state information created by the robotic system; causing data relating to the state information to at least one user; in response to providing the data to the user, receiving user instruction for performing an operation from the user; issuing a command based on the received user instruction to the at least one robotic system to cause the at least one robotic system to perform the operation.

The disclosure also optionally comprises processing the state information to generate a virtual robotic system model of at least part of the at least one robotic system in the environment; causing a visualisation of the virtual robotic system model to be displayed to the at least one user; and receiving the user instruction for performing the operation while the visualisation is being displayed to the at least one user.

The disclosure provides a method for performing an operation using one or more robotic systems comprising a manipulation system and one or more sensors, the method comprising: generating data using the one or more sensors; processing by the one or more robotic systems the generated data to create state information of the one or more robotic systems; transmitting the state information to an operator interface; receiving a command from the operator interface, the command generated in response to the transmission of the state information; and performing by the manipulation system the operation according to the command.

The disclosure provides an operator interface for a robotic system, the operator interface configured to: receive state information from the robotic system; cause a display of data relating to the state information to a user; receive input data for performing an operation from the user; use the input data to determine a command for the robotic system; and issue the command to the robotic system to cause the robotic system to perform the operation.

The disclosure also describes a modular system that is configured to be controlled via different networks including WiFi, cellular and 5G. This allows users to control the robot system from anywhere in the world by using a cloud server to coordinate access. The disclosure provides a system wherein one user can control multiple robotic systems. The disclosure provides a system wherein multiple users can control at least one robotic system. A benefit of the disclosed system is the increased scalability offered by cloud-based telepresence and machine learning.

The disclosed systems provide cloud server collecting of massive user demonstration data to perform reinforcement learning in the cloud. This can then be deployed on the robotic system. Users are therefore able to record certain repetitive operations to teach the robot system to perform the same or similar operations automatically. The disclosure provides a deep learning system that democratizes the robotic system data collection infrastructure. This improves the reliability of autonomous operations whilst accelerating the transition to fully autonomous operations by continuously collecting massive user demonstration data whilst a robotic system is in operation.

The disclosure also combines the agile mobility of an unmanned aerial vehicle (UAV), with robotic teleoperation capability. Furthermore, in some examples the disclosure provides a robotic system that is able to mechanically attach to structure in workspace to enable it to perform stable and strong manipulation. Additionally, by using a VR based intuitive and immersive human interface, it allows the system to have human-level dexterity. This disclosure provides new and intuitive teleoperation capability for robotic systems, such as for unmanned aerial vehicles (UAVs).

The disclosure provides a special type of modular robotic system with one or more manipulation systems, such as arms, and flying mobility, to take on tasks usually performed by humans. This has particular uses in high risk challenging environments where the remote capability enables tasks to be performed more safely than they would be if performed by a human directly. By utilising VR technology and transmitting information wirelessly, the one or more robotic systems work as a physical avatar for one or more users to enable a manipulation task to be performed remotely. The intuitive and immersive VR interface seamlessly augments human intelligence to allow the robotic system to have human-level dexterity, while avoiding human exposure to hazards. Robotic systems disclosed herein have increased efficiency and endurance capability for performing a particular operation, for example by the use of the attachment module, thereby enabling the robotic system to perform more operations or more complicated operations on a single charge than would be possible using known systems.

This disclosure provides a computer-implemented method of transmitting state information relating to a robotic system, the state information comprising at least part of a depth image. This method comprises receiving a depth value corresponding to at least part of the depth image, and identifying a mapping for determining a plurality of values using a depth value. The method further comprises generating a first value of the plurality of values based on a least significant component of the depth value, and generating a second value of the plurality of values based on a most significant component of the depth value, according to the mapping. Next, an encoded depth value is generated by assigning the first value into a first channel of a colour encoding model, and inputting the second value into a second channel of a colour encoding model. The encoded depth value is then compressed using an image-based lossy compression method, and the compressed encoded depth value is transmitted.

The second channel of the colour encoding model may be a colour channel of the colour encoding model.

The most significant component may be an integer component of depth value, and the least significant component may be a decimal component of the depth value.

The state information can further include an RGB image which, together with the depth image, form a coloured point cloud.

The RGB image may be compressed using an image-based lossy compression method and the compressed RGB image may be transmitted in order to provide state information relating to the robotic system.

The method can further comprise generating a third value of the plurality of values based on the most significant component of the depth value according to the mapping, wherein generating the encoded depth value further comprises assigning the third value to a third channel of the colour encoding model.

The third channel of the colour encoding model can be a colour channel of the colour encoding model.

The method may further comprise scaling the received depth value based on a range length before generating, using the scaled received depth value, the first and second values according to the mapping.

The method can include performing dynamic quantisation on the received depth value before generating, using the quantized depth value, the first and second values according to the mapping.

Performing the dynamic quantisation may comprise receiving an accuracy-range mapping, a maximum required precision of a value, a minimum range of values, and a maximum range of values. The accuracy-range mapping may provide a relationship between an accuracy of a sensor at a particular value and a position of that particular value within a range of values. Performing the dynamic quantisation may further comprise generating a quantization mapping using the accuracy-range mapping, the maximum required precision, the minimum range and the maximum range; and quantizing the received depth value using the quantization mapping.

The colour encoding model may be a YUV model. The first channel of the colour encoding model may be the Y channel of the YUV model.

The method can further comprise receiving the compressed decoded values, and decompressing the compressed encoded depth values. The encoded depth values may be decoded in order to provide state information relating to the robotic system.

This disclosure further provides a computer-implemented method of receiving state information relating to a robotic system, the state information comprising at least part of a depth image. The method comprises receiving a compressed encoded depth value corresponding to at least part of the depth image and decompressing the encoded depth value. The method further comprises identifying a mapping for obtaining a depth value using a plurality of values, determining a decoded depth value by extracting a first value of the plurality of values from a first channel of a colour encoding model, extracting a second value of the plurality of values from a second channel of the colour encoding model, and determining the depth value using the first value, the second value and the mapping.

The second value of the plurality of values may correspond to an integer component of the depth value, and the first value of the plurality of values may correspond to a decimal component of the depth value.

The state information may further include an RGB image which, together with the depth image, form a coloured point cloud.

The second channel may be a colour channel of the colour encoding model.

The method can further comprise extracting a third value of the plurality of values from a third channel of the colour encoding model, and determining the depth using the first value, second value, third value and the mapping.

The third channel may be a colour channel of the colour encoding model.

Determining a decoded depth value can further comprise scaling the determined depth value based on a range length.

The method can further comprise performing inverse dynamic quantisation on the decoded depth value.

Performing the inverse dynamic quantization may comprise receiving an accuracy-range mapping, a maximum required precision of a value, a minimum range of values, and a maximum range of values. The accuracy-range mapping may provide a relationship between an accuracy of a sensor at a particular value and a position of that particular value within a range of values. Performing the inverse dynamic quantization may further comprise generating a quantization mapping using the accuracy-range mapping, the maximum required precision, the minimum range and the maximum range; and dequantizing the decoded depth value using the quantization mapping.

The colour encoding model may be a YUV model.

Further provided by this disclosure is a computer-readable medium comprising computer executable instructions which, when executed by a computer, cause the computer to carry out any of the methods disclosed herein.

This disclosure also provides a robotic system for performing any of the methods disclosed herein. The robotic system comprises a processor and a memory communicatively coupled to the processor, the memory storing instructions configured to cause the processor to carry out a number of the methods disclosed herein.

Further provided by this disclosure is a remote terminal for performing any of the methods disclosed herein. The remote terminal comprises a processor and a memory communicatively coupled to the processor, the memory storing instructions to carry out a number of the methods disclosed herein.

Further provided by this disclosure is a computer-implemented method for quantising a value received from a sensor for transmission to a remote terminal. The method comprises receiving an accuracy-range mapping, wherein the accuracy-range mapping describes a relationship between the accuracy of a sensor at a particular value and the position of that value within a range of values, a maximum required precision, a minimum range of values and a maximum range of values. The method further comprises generating a quantization look-up table using the accuracy-range mapping, the maximum required precision, the minimum range and the maximum range. A value to be transmitted is then received from a sensor, the value is quantised using the quantization look-up table and the value is transmitted to a remote terminal.

Further provided by this disclosure is a transitory or non-transitory computer-readable medium comprising instructions which, when executed by a computer, cause the computer to carry out the method noted immediately above.

Further provided by this disclosure is a device for transmitting sensor data, the device comprising a transmission unit configured to transmit data, a receiving unit configure to receive data from a sensor, one or more processors and a memory, wherein the memory comprises instructions which, when executed, cause the one or more processors to execute any of the methods disclosed herein.

FIGURES

Specific embodiments are now described, by way of example only, with reference to the drawings, in which.

DETAILED DESCRIPTION

Figure 1:
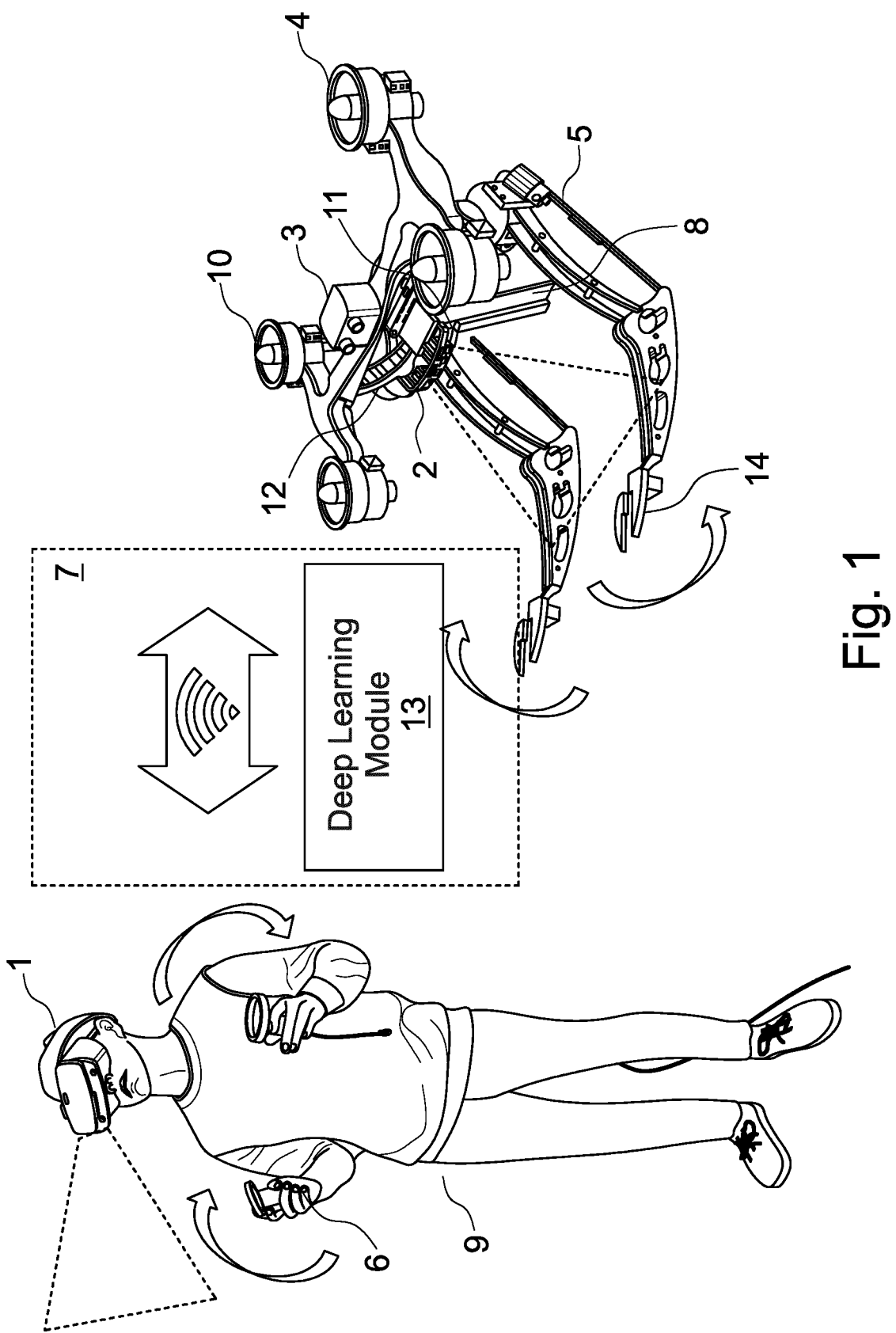
FIG. 1 depicts an example of a robotic system, a remote terminal and an operator interface.

In accordance with one implementation, FIG. 1 depicts a robotic system 10, in this case a UAV, that is in communication with a remote terminal 7. The remote terminal 7 may comprise an operator interface or may be connected to an operator interface that is distinct from the remote terminal 7. The remote terminal 7 and/or the operator interface is configured to communication with a user 9. A user 9 may also be referred to as an operator.

The user 9 is wearing a VR headset 1, which is configured to measure the six degrees of freedom (DoF) motion of the user's head and provide this information to the remote terminal 7 and/or to the robotic system 10. The remote terminal 7, which may constitute a single or a plurality of processors, is configured to cause a visualisation of robotic system data, such as a virtual robotic system model, to be displayed to a user by the operator interface, for example, on the VR headset 1. In some examples, the remote terminal 7 is located within the cloud. In one example, the VR headset 1 uses a suite of sensors on the VR headset 1 to measure the six DoF position and orientation of the head of the user 9. The six DoF tracking of the VR headset may be achieved by using the suite of sensors on the VR headset 1 or using external tracking system in the users working area. The computation for the VR headset 1 to perform its assorted functions, such as tracking the VR headset 1, may be executed in the VR headset 1 or on an external computer, system or processor. The VR headset 1 is configured to display visual information, and may also be configured to provide sound information to the ears of the user 9. For example, to enable the user 7 to perceive the sensor information gathered by one or more sensors 2 on the robotic system 10. The VR headset 1 thus forms part of the operator interface of the user 7.

The operator interface may also comprise one or more hand tracking device 6, which may be carried by the user 7 but may also be worn or attached to the user 7. The hand tracking device(s) may comprise a suite of sensors and is configured to measure the six DoF position and orientation of each hand. This may be referred to as hand position information. The six DoF tracking may be measured from the suite of sensors on the VR headset 1, by a suite of sensors comprised within the hand tracking device, or can be measured from an external tracking device. Each hand tracking device may also measure the motion of at least one finger of each hand of the user. In one example, each hand tracking device 6 is configured to measure the motion of all five fingers of the hand of a user 9. Each hand tracking device may also provide haptic output to fingers and/or palm of the user's hand. The hand tracking device 6 may be virtual, meaning the visual appearance of the hand may be directly tracked by the sensor suite on the VR headset 1 or by external sensors in the working area of the user 9. The remote terminal 7 is configured to receive the hand position information from the operator interface and to provide the hand position information to at least one robotic system 10. The remote terminal 7 is configured to receive one or more user instructions, such as for performing an operation, from the operator interface. The user instruction may comprise a positional tracking of one or more portions of the operator's body, such as the operator's head, hand(s) and/or finger(s). In some examples, the remote terminal 7 is also configured to issue a command to at least one robotic system 10 based on the received user instruction. In another example, the one or more hand tracking devices 6 may comprise haptic gloves. In another example, the one or more hand tracking devices 6 may instead form part of a haptic suit. In one example, the operator interface comprises a VR headset configured to determine a position and/or an orientation of the headset; and one or more hand tracking devices configured to determine a position of one or more hands of the user and/or an orientation of the one or more hand tracking devices and/or a position of one or more fingers of the user, wherein the user instruction comprises one or more of: the position of the headset; the orientation of the headset; the position of one or more hand tracking devices; the orientation of the one or more hand tracking devices; and the state information of one or more fingers.

The one or more sensors 2 may form part of a perception core module, which also comprise a computing unit 11. The one or more sensors 2, also referred to as a suite of sensors, may include one or more of an inertial measurement unit (IMU), an electronic magnetometer, a camera, an (near) inferred pattern projector, a Global Positioning System (GPS or equivalent), an electronic current sensor, an electronic voltage sensor, and an atmosphere pressure sensor. The sensor suite may also include one or more distance ranging sensors, such as one or more ultrasonic sensor, RADAR, and/or LIDAR such as, for example, a solid-state LIDAR sensor or a rotating LIDAR scanner.

The robotic system 10 also comprises one or more communication devices 12, which are configured to communicate with the remote terminal 7. In some examples, the communication devices may also be configured to communicate directly with the operator interface. The one or more communication devices 12 may be comprised within a perception core module and/or may form a communication module. The one or more communication devices 12 are configured to send/receive information to/from the remote terminal 7. The one or more communication devices 12 may also be configured to send/receive information to/from the operator interface directly and/or to a deep learning module 13, one or both of which may be comprised within the remote terminal 7 or may be separate from the operator interface. Thus, the perception core module may be configured to communicate with the remote terminal 7, the operator interface and/or the deep learning module 13. The one or more communication devices 12 and/or the perception core module are also configured to send and receive information to other modules on the robotic system 10. Thus, the perception core module/one or more communication devices 12/communication module is configured to receive information from other modules on the robotic system 10 to and to create information from this generated data, which may relate to the surrounding environment of the robotic system 10 and assorted state information of the robotic system 10. The information created may comprise data that has been generated by the one or more sensors 2 or any other modules comprised by the robotic system 10. The information provided by the robotic system 10 may also be referred to as state information. Whilst in this disclosure in places a single robotic system 10 may be referred to, it should be understood that these functions may also be performed by more than one robotic system 10.

The perception core module is also configured to then process (fuse) the received/gathered state information using the computing unit 11. In one example, processing the generated data comprises one or more of simultaneous localisation and mapping, visual-inertial odometry, stereo disparity, and Kalman filtering. Optionally, processing the generated data may also include optical flow, volumetric reconstruction and/or path planning. The perception core module is also configured to use the one or more communication devices 12 to transmit the processed data, which may also be referred to as perception data, to the remote terminal 7. The perception core module may also include a voltage supply device.

The robotic system 10 may comprise a propulsion system 4. The propulsion system 4 may comprise one or more propulsion units that is a configured to generate thrust, which may be used to provide motion. In the example shown in FIG. 1, the robotic system 10 is a UAV and the propulsion system 4 comprises four individual propulsion devices in the form of four electric motors and corresponding propellers. The propulsion system 4 shown in FIG. 1 may be used to cause the robotic system 10 to perform flight manoeuvres. The example shown in FIG. 1 is shown by way of example only and there may be more, or fewer propulsion units comprised within the propulsion system 4. For example, there may only be one propulsion device providing a thrust force. This may or may not be combined with a lifting surface such as an aircraft wing. The propulsion system 4 can be fixed on the robotic system, or can be rotatable, or for example, can be thrust vectored with a gimbal mechanism. In one example, each propulsion device comprised within the propulsion system 4 comprises an aerodynamic fan, an electrical motor, an electronic speed controller, and a power distribution module. The propulsion system 4 may have one or more ducts enclosing the fan or fans. The propulsion system 4 is modular and optional depending on the application requirement.

The robotic system 10 may comprise an attachment module 3 configured to enable the robotic system 10 to attach to structures near its workspace, for example by mechanical or magnetic means. This allows the propulsion system 4 to be shut off completely or reduce thrust force required to stably maintain its position and orientation relative to the workspace whilst performing an operation/task. This attachment module 3 can work with or without propulsion system 4, depending on the modular configuration of the task. For example, the robotic system 10 may use the attachment module 3 to climb. The attachment module 3 can also be used to attach the robotic system 10 to other means of mobility, such as separate robotic vehicle like a ground rover, bipedal or quadruped mobile vehicle, or other robot, or a separate manned vehicle, such as a car with a driver.

The robotic system 10 may also comprise one or more manipulation systems 5 installed on the robotic system 10 to perform physical interactions with items in the workspace or environment surrounding the robotic system 10. In one example, this can occur before or after the robotic system 10 has attached to a structure using the attachment module 3. Each manipulation system 5 may have at least 1 DoF and may use, for example, one or more electrical or hydraulic actuators with serial or parallel mechanical joint configurations. In one example, the manipulation system 5 comprises a gripper. The tip of each manipulation system 5 may be configured to enable various attachments such as different types of modular end-effectors, which may then form part of the manipulation system 5.

The manipulation system 5 may comprise one or more sensors. For example, the manipulation system 5 may have angular or translational displacement sensors at joint(s) or in the actuator(s) to measure the state of the manipulation system 5. The sensors may be magnetic or optical encoder. Each manipulation system 5 may have force sensors, such as load-cell, or current sensor in the actuators to measure or calculate the force and torque applied at the end-effector 14 of the manipulation system 5. Each actuator may have motor, gearbox, electronic motor controller to optionally control the position, velocity, current of the motor, which may be controlled to affect motion of the manipulator system 5. By controlling the motion of the manipulation system 5, the manipulation system 5 may perform a particular operation. The end-effector 14 of the manipulation system 5 can be detached or replaced by different types of configurations to suite the manipulation tasks (operations) carried out by the robotic system 10 in the workspace. Example end-effectors 14 are at least 2-finger gripper, or electric screw driver, etc. In some examples, there may be one or more IMU sensors on the manipulation system 5 and/or end-effector 14 to measure the orientation and vibration of the end-effector 14 and the manipulation system 5.

Each manipulation system 5 may or may not have at least one local computing unit to process sensor data and calculate kinematics from commands received by the robotic system 10 or the manipulation system 5. Alternatively, the computing unit may be located separately from the manipulation system 5. For example, the computing unit 11 comprised within the perception core module may be configured to process data generated by one or more sensors comprised by the manipulation system 5 and control the manipulation system 5 to perform an operation such as a remote operation, for example according to a received command.

The robotic system 10 may also comprise an electrical power unit 8 that is carried by the robotic system 10 to provide the robotic system 10 with a power supply. For example, the electrical power unit 8 may comprise one or more lithium polymer battery. The electrical power unit 8 may have both serial and parallel connection for power redundancy and may include an electronic power management device to monitor and manage the voltage and current of each cell during charging and discharging. The position or orientation of the electrical power unit may passively or actively change relative to the frame of the robotic system 10 to counter-balance the motion of the one or more manipulation systems 5. The electrical power unit 8 can also be a power transmission system receiving power from and to an external entity. For example, the robotic system 10 may feature a tethered electrical connection to a remote power source.

In operation, the user 9 can intuitively control the motion of the robotic system 10 and can perceive the sensor information that may be derived from the one or more sensors 2 of the robotic system 10 in an immersive fashion, using an operator interface and through a remote terminal 7. The operator interface 7 in this example comprises the VR headset 1, one or more hand tracking devices 6 and a controller but may also include other components such as those required for communication with the robotic system 10. The remote terminal 7 is configured to communicate with the robotic system 10.

Figure 2:
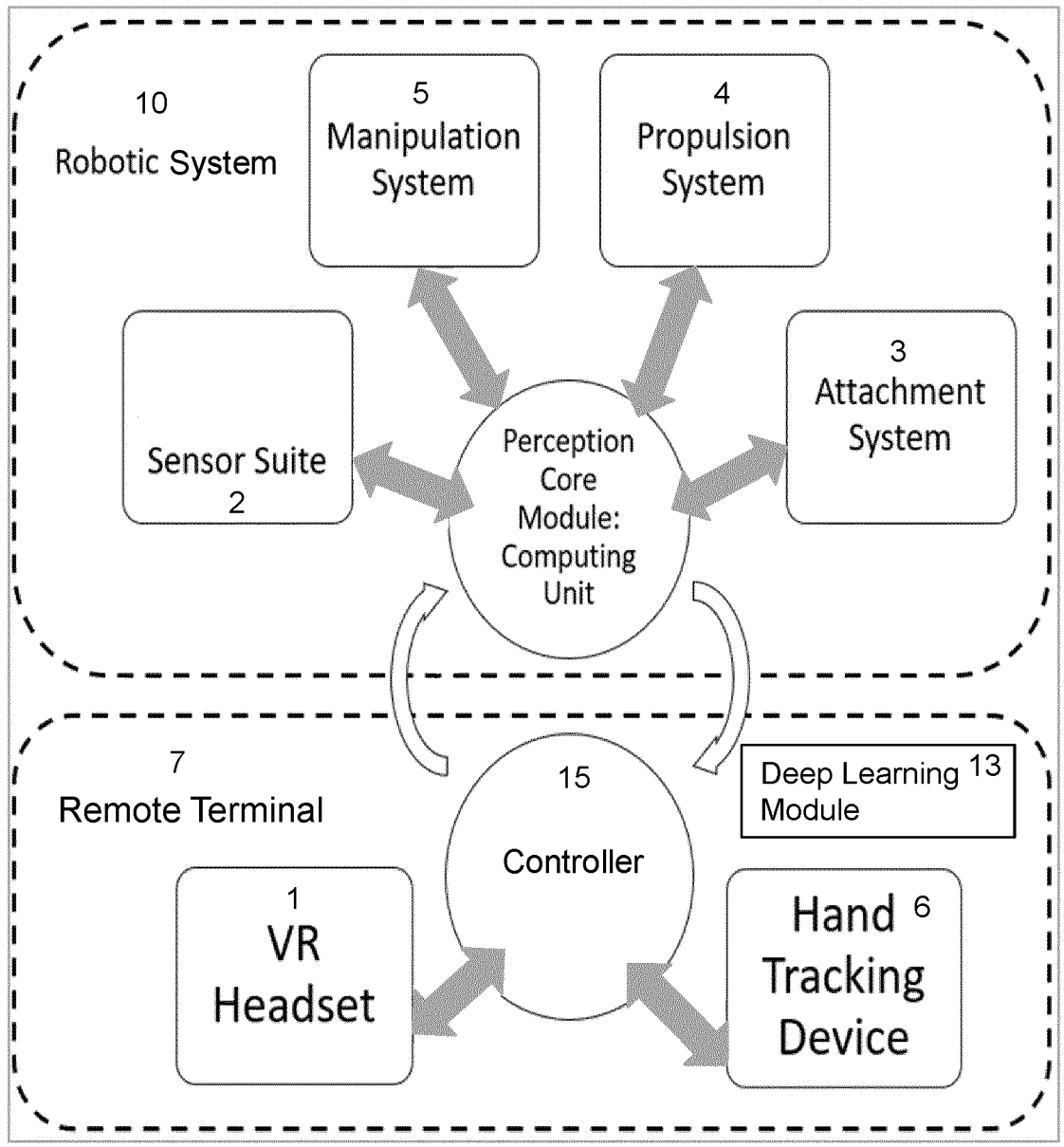
FIG. 2 depicts an example of a system architecture of a robotic system and a remote terminal.

FIG. 2 shows one example of information/data flow among subsystems/modules when the system is in operation. The computing unit 11, which may be comprised within the perception core module, is configured to receive data generated by the one or more sensors 2 in the sensor suite. The computing unit 11 may be configured to send configuration settings to the one or more sensors 2 in the sensor suite. The computing unit 11 may be configured to process the received generated data, which may be from one or more of an inertial measurement unit (IMU), an electronic magnetometer, a camera, an (near) inferred pattern projector, a Global Positioning System (GPS or equivalent), an electronic current sensor, an electronic voltage sensor, an atmosphere pressure sensor and distance ranging sensors, such as ultrasonic sensor, RADAR, LIDAR, stereo camera, time-of-flight camera. The computing unit 11 is configured to process the data generated by the one or more sensors 2 to create information relating to the environment of the robotic system 10. For example, the generated information may comprise a 3D map related to the environment surrounding the robotic system 10.

In one example, a stereo camera pair is used to process disparity information to generate depth map of colour pixels. A point cloud is then generated with respect to the camera frame in real-time. A visual-inertial odometry algorithm is used to process the information from cameras and IMU to estimate the state of the camera (pose and velocity) in real-time. Sensors 2 are hardware synchronised, meaning the measurements are timestamped with respected to the same clock using hardware trigger. The pose estimation of the camera is then used to transform the point cloud from camera frame to the local world frame to create information relating to the environment, and in particular, a 3D reconstruction of the surroundings.

The 3D map may be a fused structural and colour map, such as a coloured point cloud or coloured mesh 3D volumetric reconstruction. This map, which may be a 3D volumetric reconstruction information contains at least real-time volumetric information within the field of view of the one or more sensors of the sensor suite on the robotic system 10 at a particular time. In one example, the information relating to the environment, such as a 3D volumetric reconstruction information may contain accumulative reconstruction information outside the field of view of the one or more sensors 2 of the sensor suite on the robotic system 10. The computing unit 11 may fuse information from the one or more sensors 2 of the sensor suite to estimate the ego state of the robotic system 10, which may consist of the local six DoF position and orientation of the robotic system 10 relative to the 3D volumetric reconstruction map. This may be referred to herein as the ego state estimation information or just ego state information. The 3D volumetric reconstruction, the ego state estimation information can be sent to the remote terminal 7 or to the operator interface or component thereof, for example, these can be sent to the VR headset 1. This information can be provided to the remote terminal 7 by the one or more communication devices 12 of the communication module of the robotic system 10. Some or all of the raw data generated by the one or more sensors 2 may also or may instead be sent to the remote terminal 7 by the robotic system 10.

In one example, if the propulsion system 4 is in use, the perception core module (or computing unit 11 thereof) can use the ego state estimation as the feedback information to send a control or error compensation command to the propulsion system 4 to allow the propulsion system 4 to self-stabilise the orientation of the robotic system 10 and, optionally, the position of the robotic system 10. The computing unit 11 can also receive state information from propulsion system 4. The computing unit 11 can optionally execute path planning and obstacle avoidance algorithm to safely navigate towards a user command waypoint.

The computing unit 11 may also receive further data generated by the one or more additional sensors comprised by the one or more manipulation systems 5 and/or the end effector 14 of the manipulation system(s) to accurately estimate position, speed, force, torque state of the manipulation system(s) 5 and/or end effector 14 of the manipulation system(s). The computing unit 11 is also configured to send control commands to the manipulation system 5 to cause the manipulation system 5 to perform a particular task. For example, the computing unit 11 may send a control command to the manipulation system 5 to control the manipulation system 5 to perform a remote operation according to a command received from the remote terminal 7. The command that is issued may be based on a received user instruction, which may be received from the operator interface by the remote terminal 7. The control command may be the target state of the end effector 14 or, for example, the target state of each of a plurality of actuators comprised within the manipulation system 5. The user instruction used to determine the command for the manipulation system may comprise the position and orientation of one or more hand tracking devices 6 (a configuration) which allows the movement of hands of a user 9 to be tracked from a first configuration to a second configuration. In one example, the user instruction comprises the first and second configurations of the user's hands. In one example, the manipulation system may be configured to change from one configuration to a second configuration upon the receipt of a command, wherein the first configuration of the manipulation system 5 matches the first configuration of the user's hands and the second configuration of the manipulation system 5 matches the second configuration of the user's hands.

The command received from the remote terminal 7 may be bypassed directly to the manipulation system 5 and/or propulsion system 4 (having been received by the communication module, as appropriate). Alternatively, the command received from the remote terminal 7 may be processed by the computing unit 11, for example by adding motion compensation element, utilising the local 6 DoF position and orientation ego state estimation relative to the 3D volumetric reconstruction map. The estimated state of each of the one or more manipulation system 5 can also be sent to the remote terminal 7 by the robotic system 10.

The computing unit 11 can send operational command to the attachment system 3 and can receive state information of the attachment system 3. The operational command for the attachment system 3 may be received from the remote terminal 7 and may be bypassed directly to the attachment system 3 to cause the attachment system 3 to attach the robotic system 10 to a structure. Alternatively, the operational command received from the remote terminal 7 may be processed locally in the computing unit 11, taking account of the generated sensor data and attachment system state information to detect and tracking attachment location, and execute a feedback control loop to send command to the propulsion system 4 and the attachment system 3 to cause the robotic system 10 to perform an automatic attachment manoeuvre involving operation of the propulsion system 4 and the attachment system 3. The robotic system 10 may also be configured to send the state information of the attachment system 3 to the remote terminal 7.

The operator interface in this example comprises the VR headset 1, one or more hand tracking devices 6 and a controller. The controller of the operator interface may be configured to execute an operator interface program while the robotic system 10 is in operation. In one example, the controller is comprised within a remote command station, for example in a computer workstation, but it may instead, for example, be comprised within the VR headset 1.

As explained previously, the remote terminal 7 is configured to communicate with the robotic system 10 and, similarly, the robotic system 10 is configured to communicate with the remote terminal 7. Thus, the robotic system 10 is configured to provide state information to the remote terminal 7. In one example, the state information provided by the robotic system 10 comprises the raw data generated by the one or more sensors 2 and/or any further sensors comprised by the robotic system 10. In one example, the state information provided by the robotic system 10 is information that has been processed by the computing unit 11 and may comprise, for example, a virtual robotic system model of at least part of the at least one robotic system in the environment, the 3D volumetric reconstruction and/or point cloud reconstruction information.

Streaming the point cloud in real-time over a network allows the robotic system 10 to be controlled remotely. Such streaming may involve generating an RGB image and a depth image from a coloured point cloud. The RGB image and the depth image can then be streamed in real-time over a network. However, to do so can be challenging, due to the massive data bandwidth that is needed. It would be beneficial for the point cloud data to have an efficient and effective method to compress the information to reduce the data rate significantly while preserving the structural and colour information. Although migrating standard image-based lossless compression methods, such as PNG, can preserve the quality of the point cloud data, the compression rate is limited by dramatically increased computation, because no hardware accelerated method is available. To the contrary, standard image-based lossy compression methods, such as JPEG or H.264, are hardware accelerated with high compression rates.

Such image-based lossy compression methods employ compression techniques which are based on the ability of the human eye to perceive similar colours. For example, neighbouring pixels with similar colour values may be assigned the same value during compression of the image. This introduces noise in the image, but on a level which cannot be perceived by the human eye. The lossy spatial compression can be achieved through quantisation, subsampling (e.g. convolution) and altered intensities, as well as by assigning fewer bits on colour than on luminance information when using some compression techniques. However, the depth/structural information in the point cloud is sensitive to noise, and the lossy compression creates noisy artifacts through the compression.

In general, image-based lossy compression methods can be applied to 8-bit RGB images, but are not easily applied to depth images. Such compression algorithms are typically designed for use with standard three-channel (or 8-bit) colour video, whereas depth videos are typically single-channel with a higher bit-depth (typically 16-bits). Multiplexing such 16-bit values into two 8-bit values and passing those values through the channels of a standard codec introduces noise in the depth image due to the lossy compression methods. In addition, one of the channels may carry depth intensity information comprising bits of higher significance, and any noise introduced in this channel will introduce severe noise into the depth image. Thus, noise is introduced into point cloud data when streaming an RGB image and a depth image which have been generated from point cloud data using these image-based lossy compression methods. As such, it would be beneficial to have a method by which the depth image can be streamed using these image-based lossy compression methods.

Disclosed herein is a method of encoding, and decoding, depth data to allow for the use of standard image-based lossy compression methods for data transmission, while preserving the quality of the depth data and/or reducing artifacts due to data compression. In general, image-based lossy compression methods can be applied to 8-bit RGB images, but are not easily applied to depth images as the relevant compression algorithms are typically designed for use with standard 3-channel colour video, whereas depth values are typically single-channel with a higher bit-depth (e.g. 16-bit values). Applying such compression algorithms to 16-bit depth values introduces noise into the depth image, which degrades the quality of the depth information being transmitted. The method disclosed herein involves the use of a mapping, from a depth value to a plurality of values, to encode the depth data such that standard image-based lossy compression methods can be used to transmit depth data without such a degradation in the transmitted depth information.

In one example, the state information received from the at least one robotic system comprises User Datagram Protocol packages of data compressed using an image-based lossy compression method. In one example, processing the state information comprises: decompressing the received packages of data with a hardware accelerated decompression engine to produce an RGB image and a depth image; and decoding the decompressed depth image, wherein generating the virtual robotic system model comprises using the RGB image and the decoded depth image. In one example, the decompressed depth image is decoded to determine pixel intensity.

The above method of receiving information that has been compressed using an image-based lossy compression method in some examples makes use of a more general computer-implemented method for transmitting and receiving state information, e.g. in the form of data packages. The method for receiving data packages may comprise: receiving data packages comprising User Datagram Protocol packages of a coloured point cloud; decompressing the received data packages with a hardware accelerated decompression engine to produce an RGB image and a depth image; decoding the decompressed depth image; and producing the coloured point cloud using the RGB image and the decoded depth image. The method for transmitting data packages may comprise: projecting a coloured point cloud into an RGB image and a depth image; encoding the depth image; compressing both the RGB and depth images with a hardware accelerated decompression engine; and transmitting data packages comprising both the compressed RGB and depth images through a User Datagram Protocol. The computer-implemented method of transmitting and receiving data packages may comprise the above method for transmitting and receiving data packages. In one example, a robotic system 10 may be configured to perform the method for transmitting data packages, the robotic system 10 comprising: a processor; and a memory communicatively coupled to the processor, the memory storing instructions configured to cause the processor to carry out the method. In another example, a remote terminal 7 may be configured to perform the method for transmitting data packages, the remote terminal 7 comprising: a processor; and a memory communicatively coupled to the processor, the memory storing instructions configured to cause the processor to carry out the method.

It is to be understood that the above method is merely one implementation of a more general method, which is described below. Methods of transmitting and receiving sensor data (including, for example, data packages such as those noted above and/or point cloud data) can be facilitated using a method described below, which encodes depth information in a manner such that a standard codec will compress the depth information with reduced or minimal noise.

The coloured point cloud data to be streamed from, for example, a robotic system 10 to a remote terminal 7 may be used to generate an RGB image and a depth image. Thus, there is a need to encode the depth information (or depth data) in the depth image such that a standard codec will compress the depth information with reduced levels of noise. This can be achieved by converting n-bit depth data into values which can be utilised in standard image-based lossy compression methods. This can involve the conversion of higher bit size depth data into values which can be utilised in multi-channel lower bit size image-based lossy compression methods. This can further involve generating a plurality of values for each n-bit depth value such that the two or more values have fewer bits. This may be achieved, for example, by splitting each n-bit depth value into two or more values of fewer bits. For example, this may comprise converting a 16-bit depth value into three 8-bit values which can be encoded into the channels of a standard codec such as, for example, H.264 or JPEG. The channels of the standard codec may comprise at least one colour channel. Other channels can may be, for example, luminance channels in a YUV model, S and V channels in a HSV model, S and L channels in a HSL model or the like. The plurality of values may be generated using a mapping, which may be a function, which maps between depth values and a plurality of values. In some implementations, the same mapping may be used to map between the plurality of values and the depth value, e.g. the mapping may be bidirectional, or the mapping may be unidirectional. In other words, a first mapping may be used to determine a plurality of values from a depth value, and a second mapping may be used to obtain a depth value from a plurality of values. For example, the second mapping may be an inverse function of the first mapping.

Identifying the mapping may comprise selecting a mapping from a plurality of known mappings, e.g. from a database, a user input, a command or the like. Identifying a mapping may comprise accessing a mapping, which may be stored remotely, for example in the cloud, on a remote server, or the like.

In order to prevent loss of depth information due to the standard image-based lossy compression methods, an artificial discontinuity between neighbouring depth values is encoded into the depth data. Such an artificial discontinuity is created through the use of a mapping from each depth value to a plurality of values, wherein the plurality of values form the encoded depth data. Mapping each depth value to a plurality of values discretises the depth value thus creating artificial discontinuities between the depth values. The plurality of values allow each depth value to be represented by a number of discrete values, wherein the mapping can be selected or constructed such that similar depth values are represented by different pluralities of values. As a result of the discontinuity between values, the encoded depth image values are not affected by the compression in the same manner. Typically, a standard codec such as, for example, H.264 or JPEG will compress pixel values which are close in value, in order for more efficient transmission of data. This leads to information loss, and creates noisy artifacts in the data as neighbouring pixels with similar depth values (and thus, pixel values) are assigned the same pixel value for transmission. Introducing the artificial discontinuity via the mapping of each depth value to a plurality of values allows for neighbouring pixel values with similar depth values to be transmitted more accurately, as the discontinuity between the values prevents the pixel values from being assigned the same value for transmission. Noise due to such compression is reduced. However, information stored in the depth image values will continue to be compressed with compression techniques according to the chosen codec, allowing for efficient information compression to take place.

Figure 4:
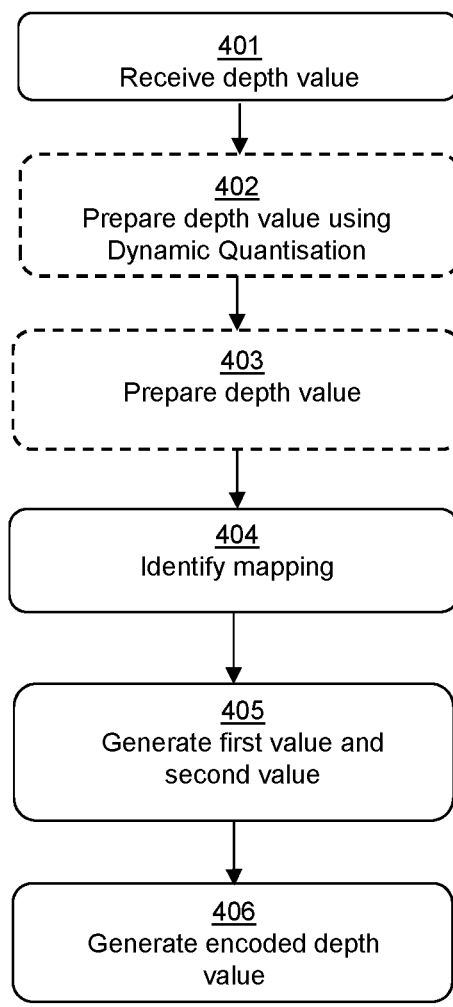
FIG. 4 is a flowchart which depicts a computer-implemented method for encoding depth data.

A computer-implemented method for encoding depth data in a manner which reduces or minimises loss is presented below, and is illustrated in FIG. 4. Such a method can, for example, facilitate the streaming/transmitting of a coloured point cloud generated by one or more sensors 10 (for example, a depth camera) on the robotic system 10. This streaming may occur between at least one robotic system 10 and a remote terminal 7.

The method may involve projecting the coloured point cloud generated by one or more of the sensors into an 8-bit integer-based RGB image and a 16-bit integer-based depth image. For example, this may include generating the 8-bit integer-based RGB image and the 16-bit integer-based depth image from the coloured point cloud.

I. Receive (401) a depth value which corresponds to at least part of a depth image (e.g. one or more pixels of a depth image). The depth image may form part of a coloured point cloud generated by, for example, the stereo camera pair, where the coloured point cloud is projected into an RGB image and a depth image.

II. Optionally, prepare (402) the depth values by performing Dynamic Quantization using a pre-generated sensor specific lookup table (LUT) taking into account a sensor accuracy-range mapping, such as an accuracy-range curve. This step is explained in more detail later in the description.

III. Optionally, prepare (403) the depth values for encoding by rescaling the depth values to the maximum range of the n-bit depth intensity values, or by any other appropriate means of rescaling. This ensures maximum utilisation of available bits. Whilst this step is optional, throughout this description it is to be understood that the depth value may analogously refer to a rescaled depth value.

IV. Identify (404) a mapping for determining a plurality of values using a depth value. Such a mapping may be predetermined, and may involve, for example, some or all possible depth values each being mapped to a value corresponding to the integer part of the respective depth value, and to a value corresponding to the decimal part of the respective depth value. In other implementations, the mapping may involve more complex functions or computations in order to map some or all depth values to a plurality of values. The plurality of values to which the depth values are mapped may, for example, be integer values and/or may be in binary form. Such a mapping may create a discontinuous index of values, wherein a plurality of such values can be used to represent each respective depth intensity value. This index can be used to quantise the depth values.

In some implementations, the same mapping may be used to map between the plurality of values and the depth value, e.g. the mapping may be bidirectional, or the mapping may be unidirectional. In other words, a first mapping may be used to determine a plurality of values from a depth value, and a second mapping may be used to obtain a depth value from a plurality of values. For example, the second mapping may be an inverse function of the first mapping.

Identifying the mapping may comprise selecting a mapping from at least one known mapping, e.g. from a database, a user input, a command or the like. Identifying a mapping may comprise accessing a mapping, which may be stored locally, for example in a local memory, or remotely, for example in the cloud, on a remote server, or the like.

V. Generate (405) a first value of the plurality of values based on a least significant component of the depth value according to the mapping, and generate a second value of the plurality of values based on a most significant value of the depth value according to the mapping. For example, the most significant component may be an integer part of the depth value and the least significant component may be a decimal part of the depth value.

VI. Generate (406) an encoded depth value by assigning the first value of the depth value into a first channel of a colour encoding model, and assigning the second value into at least a second channel of the colour encoding model. In some implementations, at least the second value may be assigned to a colour channel of the colour encoding model. In some implementations, for example, the second value can comprise an integer component of the depth value, and the first value can comprise a decimal component of the depth value.

Optionally, the mapping of the depth value to the plurality of values may include a dependency on the value of the least significant bit or bits. For example, depth values having '0' as the least significant bit may be mapped to a particular value and depth values having '1' as the least significant bit may be mapped to a different value, according to the mapping. This ensures that consecutive depth values are encoded using a different algorithm, thereby introducing further discontinuity between values. Thus in some implementations, each depth value may be mapped to a third value according to such a mapping, wherein the third value which results from the mapping is dependent upon the least significant component (e.g. decimal part) of the depth value. This can provide a means of computing an encoded value differently depending on whether the least significant bit of the most significant component of the depth value is '0' or '1'.

In some implementations, the most significant component can be mapped to two or more values according to the mapping, wherein each of the two or more values is used as an input into respective channels of a colour encoding model (e.g. a codec). In one example, a mapping can be identified between the most significant component and two values. A second value and a third value of the plurality of values may then be generated based on the most significant component of the depth value. The second value may then be assigned to a second channel of a colour encoding model, and the third value may then be assigned to a third channel of the colour encoding model. The second channel and the third channel can be colour channels of the colour encoding model.

The encoded depth data which results from the above algorithm is then compressed using an image-based lossy compression method, for example via a standard codec, such as JPEG or H.264. Compressing the encoded depth value may involve using an image-based lossy compression method to compress both the first value and the second value of the encoded depth data. The respective channels of the standard codec may have different compression rates, and as such the encoded depth data in each channel may be compressed according to a different compression rate. This may allow for the encoded depth data in a particular channel to be compressed less, e.g. at a lower rate, than encoded depth data in another channel. Placing information which is, for example, more sensitive to noise in a channel with a lower compression rate may allow for more depth data information to be retained. In some implementations, the colour channel or channels of the colour encoding model may have a higher rate of compression than a respective other channel of the colour encoding model. The compressed encoded depth data is then transmitted in order to provide state information relating to the robotic system.

The generation of a first value of the plurality of values based on the least significant bits of each depth value and the generation of a second value of the plurality of values based on the most significant bits of each depth value, based on the mapping, creates artificial discontinuities in the encoded depth data. Thus when the encoded depth data is transmitted, the standard codec compresses the information with reduced or minimal noise due to these artificial discontinuities created between depth values. Thus, the depth information lost in the compression and transmission of the information is reduced.

The encoded depth values in the channels of the standard codec are then decoded at the receiver end, with structural and colour information preserved to an acceptable level. This provides an efficient and effective method to compress the depth information to reduce the data rate significantly while preserving the structural and colour information, ensuring that the original depth image can be accurately reconstructed using the decoded depth values. This can allow point cloud data to be streamed in real-time over a network, allowing the robotic system 10 to be controlled remotely. As such, this method may form part of a computer-implemented method of transmitting and/or receiving state information relating to a robotic system, the state information comprising at least part of a depth image or the like. The state information can further include an RGB image which, together with the decoded depth image, can be used to regenerate the coloured point cloud.

Figure 5:
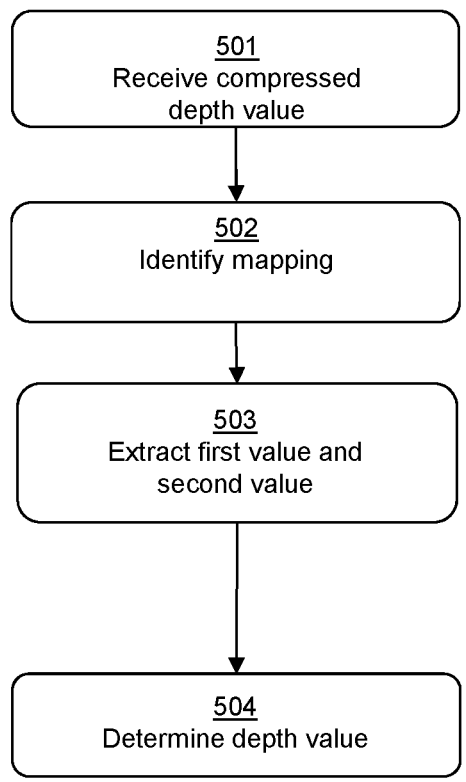
FIG. 5 is a flowchart which depicts a computer-implemented method for decoding depth data.

FIG. 5 illustrates a method of receiving state information. At the receiver end, decoding of depth information may take place according to the following computer implemented method. The receiver end may be, for example, the robotic system 10, a server connected remotely to the robotic system 10 and/or the like. The receiver end may be the remote terminal discussed throughout the specification. The receiving end is equipped such that it can receive information from the channels of a standard codec such as, for example, H.264 or JPEG.

I. Receive (501) a compressed depth value corresponding to at least part of the depth image. This may be the compressed encoded depth value discussed throughout the description.

II. Identify (502) a mapping for obtaining a depth value using a plurality of values. Such a mapping may be predetermined, and may involve, for example, some or all possible depth values each being mapped to a value corresponding to the integer part of the respective depth value, and to a value corresponding to the decimal part of the respective depth value. The mapping may be constructed such that the plurality of values are obtainable from the encoded depth values. In other implementations, the mapping may involve more complex functions or computations in order to map some or all depth values to a plurality of values. The plurality of values to which the depth values are mapped may, for example, be integer values and/or may be in binary form. Such a mapping may create a discontinuous index of depth values, wherein a plurality of such values can be used to represent each respective depth intensity value. This index can be used to quantise the depth values.

III. Extract (503) a first value of the plurality of values from a first channel of the colour encoding model, and extract a second value of the plurality of values from a second channel of the encoding model.

IV. Determine (504) the depth value using the first value, the second value and the mapping.

Identifying the mapping may comprise selecting a mapping from a plurality of known mappings, e.g. from a database, a user input, a command or the like. Identifying a mapping may comprise accessing a mapping, which may be stored remotely, for example in the cloud, on a remote server, or the like.

The mapping identified may be the same mapping used in the encoding step outlined previously in the specification. The mapping may be used to determine a plurality of values from a depth value and/or to obtain a depth value from a plurality of values. In some implementations, the same mapping may be used to map between the depth value and the plurality of values, e.g. the mapping may be bidirectional, or the mapping may be unidirectional. In other words, a first mapping may be used to determine a plurality of values from a depth value, and a second mapping may be used to obtain a depth value from a plurality of values. For example, the second mapping may be an inverse function of the first mapping.

The first value extracted from a first channel may correspond to a decimal component of the depth value, and the second value extracted from a second channel may correspond to an integer component of the depth value. The second channel of the colour encoding model may be a colour channel of the colour encoding model.

The method can further comprise extracting a third value from a third channel of the colour encoding model, and using the first value, the second value, the third value and the mapping to determine the depth value. During decoding, the depth value may also be scaled based on a range length. This scaling may compensate for scaling of the depth value which took place prior to the encoding of the depth value. It is to be understood that, similarly to the above-described method of transmitting state information, the operation of scaling the depth value is optional, and subsequent reference to the depth value may analogously relate to a scaled depth value.

If the optional step of Dynamic Quantization is used to quantize the data with lookup table (LUT) before encoding, the corresponding dequantization with inverse lookup table (ILUT) should be performed after decoding.

The above-described method of decoding may be applied to decode data which has been encoded using any of the encoding methods described throughout this specification. For example, this method may be used to decode depth information which has been encoded into the channels of a YUV colour model, or any other suitable colour model.

In some implementations, the encoding of the depth image data can be achieved through converting the 16-bit depth intensity values into three 8-bit values, arranging them in YUV channels and creating artificial discontinuities between depth image values. The generation of a first value of the plurality of values based on the least significant bits of each depth value and the generation of a second value of the plurality of values based on the most significant bits of each depth value, based on the mapping, creates the artificial discontinuities in the encoded depth data.

YUV is a colour encoding model comprising three channels. The YUV channels comprise U and V components which, in standard image-based compression, represent the colour information of a respective image and are known as the Chrominance or Chroma UV. The U and V channels can be referred to as the colour channels, or as 'Chroma U' and 'Chroma V'. The Y Channel represents the luminance of the respective image, and is known as the Luminance or Luma. Typically, the Luminance channel comprises significantly more information regarding the respective image than the Chroma UV (e.g. colour) channels. As such, information contained in Chroma UV channels can be compressed more than information contained within the Luminance channel. Thus, the 16-bit depth intensity value can be arranged in YUV channels, for example such that the least significant bit or bits of each value is encoded in the Luminance channel, and as a result is not as compressed as the information encoded in the Chroma UV channels. In addition, generating a first value for each depth value based on a least significant component of the respective depth value and generating a second value for each depth value based on a most significant component of the respective depth value may create an artificial discontinuity to between the encoded depth values, to further reduce the compression of the depth data. A general algorithm for encoding the depth image data in this manner is outlined below:
 a. Optionally, prepare the depth values for encoding by performing Dynamic Quantization using a pre-generated sensor specific lookup table (LUT) taking into account a sensor accuracy-range mapping, such as an accuracy-range curve. More detail on this step can be found later in the description.
 b. Optionally, prepare the depth values for encoding by rescaling the depth values to the maximum range of the 16-bit depth values or by any other appropriate means of rescaling. For example, the depth values may be max-min normalised (as can be seen in 2(a) below).
 c. Identify a mapping for determining a plurality of values using a depth value. Such a mapping may be predetermined, and may involve, for example, some or all possible depth values each being mapped to a value corresponding to the integer part of the respective depth value, and to a value corresponding to the decimal part of the respective depth value. In other implementations, the mapping may involve more complex functions or computations in order to map some or all depth values to a plurality of values. The plurality of values to which the depth values are mapped may, for example, be integer values and/or may be in binary form. Such a mapping may create a discontinuous index of depth values, wherein a plurality of values can be used to represent each respective depth intensity value. This index can be used to quantise the (optionally rescaled) depth values.
 d. Generate a first value of the plurality of values based on a least significant component of the depth value according to the mapping, and generate a second value of the plurality of values based on a most significant value of the depth value according to the mapping. For example, the most significant component may be an integer part of the depth value and the least significant component may be a decimal part of the depth value.
 e. Generate an encoded depth value by assigning the first value of the depth value into a first channel of a YUV model, and assigning the second value into a second channel of the YUV model. In implementations which comprise mapping the depth value to a third value of the plurality of values, the third value can be assigned into a third channel of the YUV model.
   For example, the mapped values corresponding to the most significant component of each depth value (e.g. the second value and/or the third value) may be encoded to 'Chroma U' and 'Chroma V' channels. The encoding of the data may involve assigning the quantised data to two 8-bit values which can be encoded in the 'Chroma U' and 'Chroma V' channels, respectively. A mapped value corresponding to the least significant component (e.g. the first value) may be encoded to the 'Luminance' channel.
   In other implementations, a mapped value corresponding to the most significant component may be encoded to 'Chroma U' and a mapped value corresponding to the least significant component may be encoded to the 'Chroma V'. A third mapped value which is dependent on the least significant bit of the depth value may then be encoded into the 'Luminance' channel. A specific example is provided for this implementation in step 2(b) (i), (ii) and (iii) below.

An advantage associated with assigning a mapped value to the 'Luminance' channel is that data in the 'Luminance' channel is compressed less when an image-based lossy compression method is applied to compress the data. This allows for more information associated with the data to be retained after compression and transmission of the data. By assigning a mapped value associated with the least significant component of a depth value to the 'Luminance' channel, more detailed depth values are retained after compression and transmission of the depth data. For example, if a mapped value associated with the least significant component of the depth value comprises information regarding the decimal value of the depth value, encoding such information in the Luminance channel may enable the depth information to be retained in greater detail than otherwise would be possible. Thus the less significant bits of each depth value, which represent the details in the point cloud, are retained with less loss and noise due to compression.

One example of an algorithm to help facilitate the methods of transmitting and receiving data packages is given below. This facilitates the streaming/transmitting of a coloured point cloud generated by one or more sensors 10 (for example, a depth camera) on the robotic system 10. This streaming may occur between at least one robotic system 10 and a remote terminal 7. In this example, the algorithm comprises the following steps (step 1-4 executes in the transmitter, and step 5-8 executes in receiver):
 1. Project the coloured point cloud into an 8-bit integer-based RGB image and a 16-bit integer-based depth image if the camera does not provide it. This may involve generating an 8-bit integer-based RGB image and a 16-bit integer-based depth image from the coloured point cloud generated by one or more sensors of a robotic system.

2. Encode the depth image into NV12 YUV pixel format. For each depth pixel intensity ('Depth Value'), do as follows:
   a. Given the expected 'max depth', 'min depth' and an unsigned integer 'range length', then, normalise the 'depth value' to $$\text{'Scaled Depth'} = \frac{\text{'Depth Value'} - \text{'min depth'}}{\text{'max depth'} - \text{'min depth'}} \times (\text{'range length'} - 1)$$

The 'range length' can represent the maximum integer number that the scaled depth data can reach.

b. Map the 16-bit depth value to an 8-bit 'Chroma U' value, 8-bit 'Chroma V' value and an 8-bit 'Luma' value, using the 'range index'=Floor('Scaled Depth'), and 'remain'='Scaled Depth'−Floor('Scaled Depth'), where a mapping is defined by the following relationships:

i.
   $$\text{'Chroma } U\text{'} = \frac{\text{remainder of 'range index' divided by } \sqrt{\text{'range length'}}}{\sqrt{\text{'range length'}}} \times 255;$$

ii.
   $$\text{'Chroma V'} = \frac{\text{Integer of 'range index' divided by } \sqrt{\text{'range length'}}}{\sqrt{\text{'range length'}}} \times 255;$$

iii. If the least significant bit in 'range index' is 0, then 'Luma'='remain'×255, else 'Luma'=(1−'remain')×255.

3. Compress both the RGB and depth images through standard hardware accelerated H.264 compression engine.

4. Transmit, e.g. stream, both the compressed RGB and depth images through the UDP (User Datagram Protocol)

5. Receive UDP packages

6. Decompress the RGB and depth images with hardware accelerated H.264 decompression engine.

7. Decode the decompressed depth image to determine pixel intensity ('Depth Value'). For each 8-bit 'Chroma U' value, 8-bit 'Chroma V' value and an 8-bit 'Luma' value, do as follows:
   a. Decode the 'range index'=u+v×√'rangelength', where i.
   $$u = \text{Floor}\left(\frac{\text{'Chroma } U\text{'}}{255} \times \left(\sqrt{\text{'range length'}} - 1\right) + 0.5\right)$$

ii.
   $$v = \text{Floor}\left(\frac{\text{'Chroma V'}}{255} \times \left(\sqrt{\text{'range length'}} - 1\right) + 0.5\right)$$

b. Decode 'remain', wherein if least significant bit in 'range index' is 1, $$\text{'remain'} = 1 - \frac{\text{'Luma'}}{255},$$

else if least significant bit in 'range index' is 0, $$\text{'remain'} = \frac{\text{'Luma'}}{255},$$

c. Decode 'Scaled Depth'='range index'+'remain'
   d. Decode

'Depth Value' =
   $$(\text{'max depth'} - \text{'min depth'}) \times \frac{\text{'Scaled Depth'}}{\text{'range length'} - 1} + \text{'min depth'}$$

8. Unproject the coloured point cloud using the RGB image and the decoded depth image. This step can involve using the decoded depth image and the RGB image to regenerate the coloured point cloud generated by one or more sensors on the robotic system. This step can take place at the remote terminal.

It should be understood that this algorithm is given by way of example only, and there may be a number of variations and equivalents to the exact details of the algorithm that are considered to fall within the scope of the disclosure.

A numerical example of the use of this algorithm to encode (and decode) a 16-bit value into three 8-bit values is outlined below.

In this example, the following values are assumed as given, although it is to be understood that these values are merely exemplary:
Depth intensity value: 9379.5 or 10010010100011.1
Max depth: 65536
Min depth: 1
Range length: 10000
The 'scaled depth' is computed (step 2a):

$$\text{'Scaled depth'} = \frac{9379.5 - 1}{65536 - 1} * (10000 - 1) = 1430.924262$$

The 16-bit depth value is then split into an 8-bit 'Chroma U' value, an 8-bit 'Chroma V' value and an 8-bit 'Luma' value (step 2b):
'Range index'=floor (1430.924262)=1430=10110010110
'remain'=0.924262

$$\text{'Range index' divided by } \sqrt{\text{'Range length'}} = \frac{1430}{100}$$

remainder of range index' divided by √'Rangelength'=30
Integer of range index' divided by √'Rangelength'=14

$$\text{Chroma } U = \frac{30}{\sqrt{10000}} * 255 = 76.5 = 1001100.1$$

$$\text{Chroma } V = \frac{14}{\sqrt{10000}} * 255 = 35.7 = 100011.1011001100110011$$

The least significant bit of the 'Range index' is zero, thus:
'Luma'=0.924262*255=235.68681=11101011.10101111 11010011

The values for 'Chroma U', 'Chroma V' and 'Luma' channels are then assigned to the 'Chroma U', 'Chroma V' and 'Luma' channels respectively, and the encoded depth data is compressed using a lossy compression method, and transmitted.

After transmission, or upon reception, the encoded compressed depth data is decompressed and the encoded depth data is decoded in order to return the original depth value (step 7):

$$u = \text{Floor}\left(\frac{76.5}{255} * \left(\sqrt{10000} - 1\right) + 0.5\right) = 30$$

$$v = \text{Floor}\left(\frac{35.7}{255} * \left(\sqrt{10000} - 1\right) + 0.5\right) = 14$$

$$\text{'remain'} = \frac{235.68681}{255} = 0.92462$$

$$\text{'range index'} = 30 + 14 * \sqrt{10000} = 1430$$

$$\text{'Scaled depth'} = 1430 + 0.924262 = 1430.924262$$

$$\text{'Depth value'} = (65536 - 1) * \frac{1430.924262}{10000 - 1} + 1 = 9379.5$$

It is to be understood that this numerical example does not take into account any noise which may have affected the data during the compression, streaming, transmission and decompression stages of steps 3-6, and is given merely as an example of the decoding calculation.

It can be seen from the above example that the 'Depth value' is returned at the end of the decoding stage of the algorithm. This sample calculation assumes noiseless and lossless compression, streaming, transmission and decompression of the encoded data. In practice, there may be some information loss during those stages due to noise and other artifacts. However, the artificial discontinuities introduced between the depth values during the encoding stage ensure that the structural information is preserved to an acceptable level upon decoding.

In steps 2a and 2b above, a first value and a second value are generated according to a mapping such that the depth information corresponding to the normalised 16-bit depth value is assigned, or mapped to, two 8-bit values using a division operation, where the integer and remainder values resulting from the division operation are used to form the two 8-bit values respectively. However, this is merely one example of generating at least a first value and a second value using a mapping such that an n-bit depth value is encoded for input into different channels of a colour encoding model. A depth value can be mapped to two or more values in other ways-for example as follows:

A. Scale the 16-bit depth value linearly.
   Rescaled range index=range_index/range_length× 65536
B. Input the floored scaled range index into the Chroma U and Chroma V channels.
   Chroma U=higher 8-bit of the rescaled range index
   Chroma V=lower 8-bit of the rescaled range index
C. Input the remainder of the floored scaled range index into the Luma channel.

The less significant bits (e.g. the remainder of the floored scaled range index) represent the details in the point cloud. The Luma channel is compressed less than Chroma U and V, which means that details in the point cloud are retained with less loss and noise due to compression.

In this example, 16 and 8 bits have been used; however any bit length is applicable. Steps A and B can replace one or both of steps 2a and 2b above.

Figure 6:
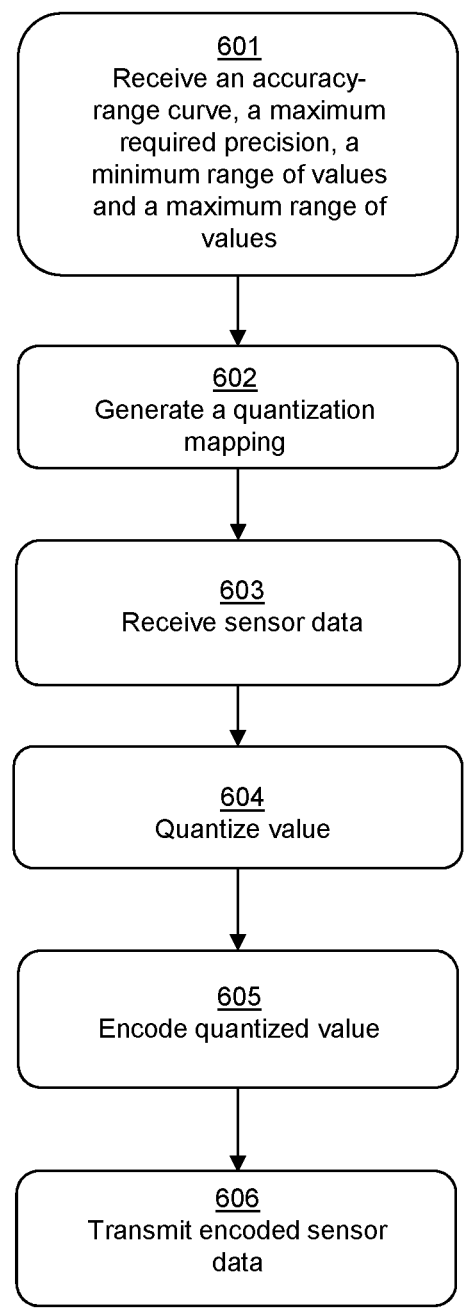
FIG. 6 is a flowchart which depicts a computer-implemented method for transmitting sensor data/

The optional step of Dynamic Quantization is included in the above methods of encoding, and is further discussed here, with reference to FIG. 6.

FIG. 6 shows a flowchart illustrating a method of encoding sensor data. The method may comprise, in an operation entitled "Receiving accuracy-range mapping, maximum required precision, minimum range of value and maximum range of values", receiving 601 an accuracy-range mapping, a maximum precision, a minimum range of values and a maximum range of values. The accuracy-range mapping may comprise an accuracy-range curve. The method may further comprise, in an operation entitled "Generating quantisation mapping", generating 602 a quantisation mapping. As discussed in detail below, in some implementations, the quantisation mapping may be a lookup table or inverse lookup table. The method may further comprise, in an operation entitled "Receiving sensor data", receiving 603 sensor data from a sensor. The sensor data comprises a value which is to be transmitted. For example, the value may be a depth value. The method may further comprise, in an operation entitled "Quantising value", quantising 604 the value from the sensor data using the quantisation mapping. The method may further comprise, in an operation entitled "Encoding the quantised value", encoding 605 the quantised value, e.g. using any known encoding technique, to obtain encoded sensor data. The method may further comprise, in an operation entitled "Transmitting the encoded sensor data", transmitting 606 the encoded sensor data. That is, the encoded sensor data may be the encoded quantised value, or may comprise the encoded quantised value. The encoded sensor data may, for example, also comprise other data.

Many 3D sensors have inherent noise. For some technologies, the noise structure depends greatly on measurement range. This is especially evident in stereovision-based technology. As an example, the Intel Realsense D435 planar fit RMS error may serve as an accuracy-range curve estimator (seen in FIG. 7). Notably, the sensor accuracy varies with range from sub-millimeter to several centimeters. As a consequence, the measurements taken by the device have a random noise component that varies greatly with the distance.

Typically, quantization for depth data is performed before compression. Uniform quantization is however ill-suited for the sensor, as the accuracy of the sensor varies dramatically with the distance. Ideally the quantization should keep high precision at close range and decrease precision gradually as the range increases. A simplified scheme is typically used (for example uniform quantization, arbitrary quantization cutoffs, inverse depth encoding with scaling factor). Here, the step of performing exact non-uniform accuracy-range curve guided quantization, later Dynamic Quantization, is described.

Figure 7:
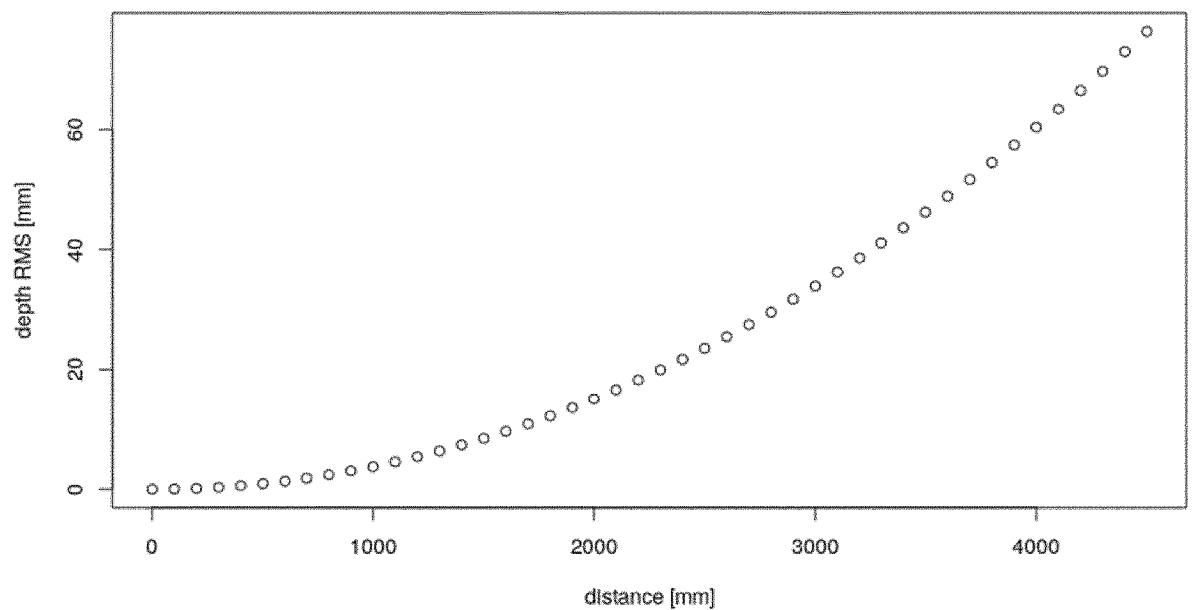
FIG. 7 illustrates an exemplary accuracy-range curve.

From the accuracy-range mapping, in this example an accuracy-range curve, an example of which is shown in FIG. 7, the maximum required precision, the minimum range and the maximum range, a quantization lookup table (later LUT) and inverse quantization (also referred to as dequantization) lookup table (later ILUT) can be generated. With (I) LUT, (de) quantization may be performed in terms of trivial O (1) algorithmic complexity lookup table query. It is to be understood that although the present description refers to lookup tables, e.g. LUT and ILUT, these are merely exemplary forms of mapping. That is, the method described herein would apply with a variety of mapping techniques, including LUT and ILUT. A basic algorithm for LUT and ILUT generation pseudocode is provided below.

```
(LUT, ILUT) = quantizationLUT(ac_curve, max_precision, min_range, max_range)
{
# LookUp Table and Inverse LookUp Table
   LUT = numeric(max_range + 1) # LUT is 1-indexed, L[d+1] is lut value for d
   ILUT = numeric(max_range + 1) # ILUT is 1-indexed, ILUT[lut+1] has values
         # for lut (the distance)
d = min_range
while(d <= max_range)
{
   # accuracy may be higher than our max desired precision
   d_sd = max(max_precision, ac_curve(d))
   # the values in range [d, d+floor(d_sd)-1] are quantized together
   for(j in 1:floor(d_sd))
      if(d+j <= length(LUT))
         LUT[d + j] = LUT[d] + 1
   # dequantization representative
   ## anticollision (never overshoot)
   ## ILUT[LUT[d+1] +1] = d
   ## minimize error (middle value)
   ILUT[LUT[d+1] +1] = (d + (d + floor(d_sd) -1))/2
   # move to next quantized value
   d = d + floor(d_sd)
}
# trim ILUT only to LUT entries
ILUT = ILUT[1:LUT[length(LUT)]]
```

Figure 8:
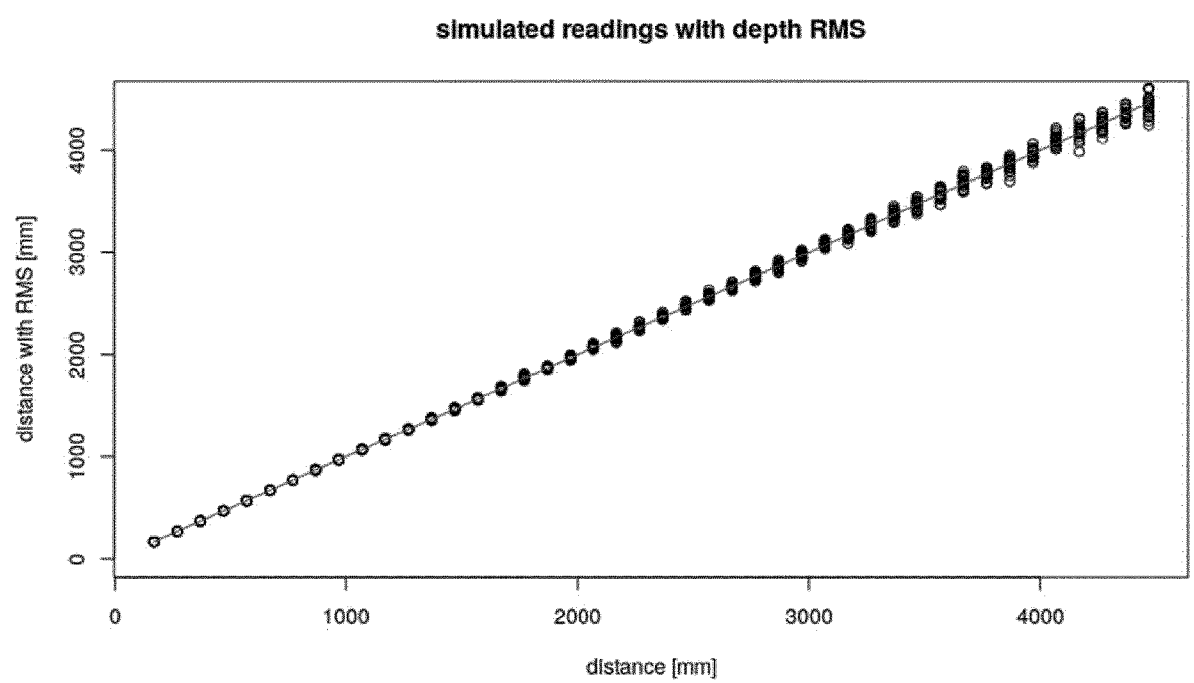
FIG. 8 illustrates a graph depicting distance-dependent sensor noise.
Figure 9:
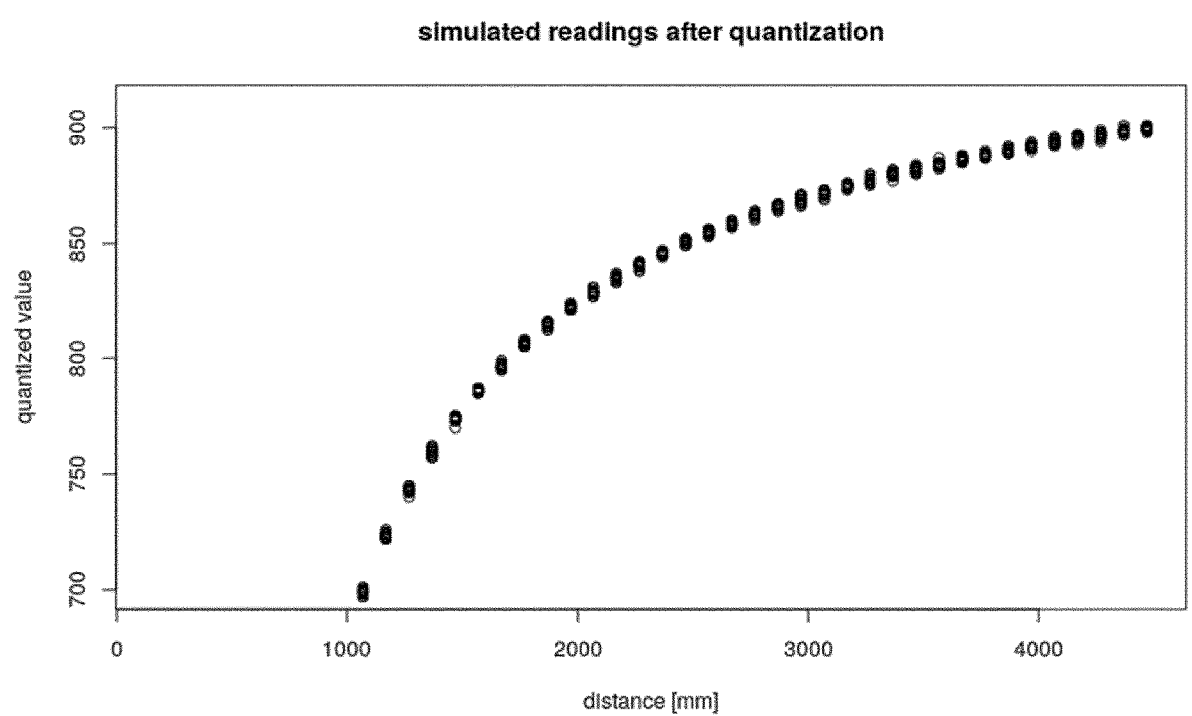
FIG. 9 illustrates a graph depicting sensor noise after quantization.
Figure 10:
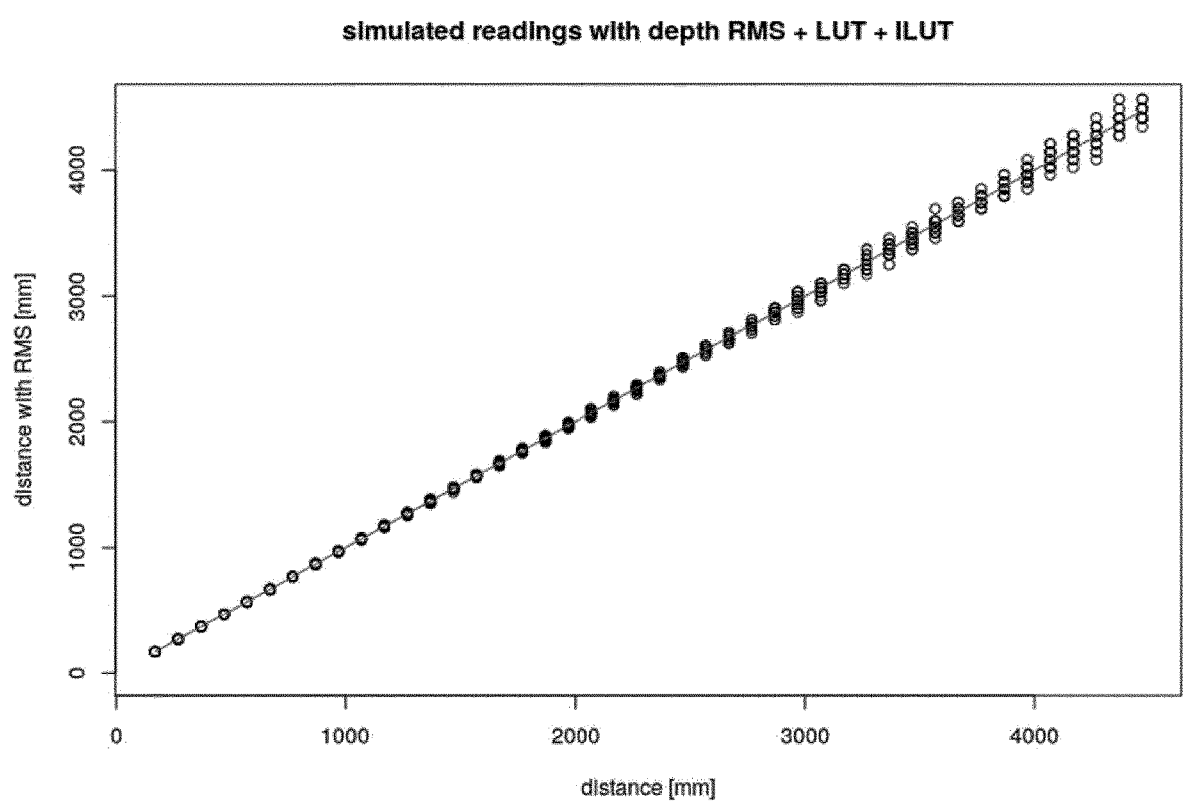
FIG. 10 illustrates a graph depicting sensor noise after quantization and dequantization.

It is worth noting that:

1) In the above basic algorithm we quantize floor (standard deviation) values together. A multiplier may be used here to control the quantization granularity (e.g. half the standard deviation values quantized together).
2) Two example rules are provided for choosing a dequantization representative. According to the first example rule, the use of a smallest value as a dequantization representative ascertains that after dequantization, the original value is never overshot. The smallest value may be the smallest value of the values falling within a range which are quantized together. This rule is useful with lossless compression for collision avoidance applications. The second example rule uses a middle value as a dequantization representative, which minimizes error.
3) If the middle value is used for dequantization, the value may fall between original quantized values resulting in an "and a half" value. A number of solutions may be used here, for example trimming. Alternatively, the values may be quantized together only in odd size groups. In such cases, less than 1 extra bit is needed for quantized data encoding (the worst case is only groups of 1 and 2 values and all groups of 2 converted to odd size groups of 1).
4) The dynamic quantization approach described herein is different from PDF (Probability Density Function) optimized non-uniform quantization used in Signal Processing. The PDF of input data (which is 3D sensor scene dependent) is not known. It may be expected that the depth value at particular 3D sensor's pixel is normally distributed with its mean at real value and standard deviation following an accuracy-range mapping, such as an accuracy-range curve. In statistical terms, the conditional PDF given a depth value may be Gaussian with that mean and standard deviation from accuracy-range curve. The distribution at each pixel is different in both mean and standard deviation (as seen in FIG. 8).
5) After performing dynamic quantization, the quantized values have the same standard deviation (as seen in FIG. 9). In statistical terms, the conditional PDF of quantized data given depth may be Gaussian with mean at a quantized value and the same standard deviation across all range of values.
6) Finally, the dequantized data may provide fine precision at short range, with the range becoming gradually coarser as the range increases (as seen in FIG. 10). The values are falling into o-buckets (standard deviation).

The Dynamic Quantization supports the encoding on multiple levels:

1. The random noise component from low order bits is removed supporting efficient compression. This is especially important in the method focussing on the details of the point cloud in the luma channel.
2. The bit depth requirements are reduced. The quantized data needs less bits compared to original data if accuracy decreases with the distance (typical case). For example the 16 bit data after quantization may end up as 10 bit data. This directly supports compression. Together with optional rescaling to 16 bit or inherent 8+8+8 (YUV), extra spacing is introduced between values.
3. The reduced number of symbols supports Entropy Coding (e.g. H.264 CABAC/CAVLC).
4. Codecs (e.g. video) employ block encoding. In similar range areas (blocks) we benefit from the 68-95-99.7 rule (standard deviation intervals of normal distribution).
5. In the quantized domain, the standard deviation is no longer dependent on the distance. If a block encoding technique for representing data as block mean+−value is used, the blocks may share similar properties across all ranges of distances. In particular, similar block encoding may be reused for multiple blocks. In other words, the quantized data noise is no longer distance dependent which may be exploited in block encoding (potentially similar block structure across all distances).

6. After dynamic quantization, information is lost only to the extent of noise. It may be possible to control how much noise to keep (as mentioned, using standard error multiplier controlling granularity of quantization).
7. By 68-95-99.7 rule, 99.7% of similar range data will be representable as mean +−1, 2, 3σ. Quantized noisy data will be representable as mean+−1, 2, 3 for similar range. In compression methods employing blockwise variable length zigzag encoding (e.g. RVL like) value should be encodable in 4 bits (minimal, the values 0, 1, −1, 2, −2, 3, −3 are encodable on 3 bits with 4th variable length bit 0).

Using the state information received by the remote terminal 7, the remote terminal 7 is configured to perform a number of operations, which may include generating a virtual robotic system model of at least part of the at least one robotic system 10 in the environment, and/or causing a workspace reconstruction rendering to be displayed to a user on an operator interface and/or causing a virtual robotic system rendering to be displayed to a user on an operator interface and/or causing an interactive robotic system simulation to be displayed to a user on an operator interface. The virtual robotic system model comprises at least part of the at least one robotic system 10 in the environment. In other words, the virtual robotic system model comprises data/information relating to the environment of the at least one UAV, as well as data/information relating to at least part of the at least one robotic system 10 within the environment. Accordingly, the at least part of the at least one robotic system 10 is presented in relation to the environment surrounding the corresponding one or ones of the at least one robotic system 10.

The workspace reconstruction rendering is performed using the 3D volumetric reconstruction or point cloud reconstruction information received from the robotic system 10 by the remote terminal 7. This 3D volumetric reconstruction or point cloud information contains at least real-time volumetric or point cloud information within the field of view of the one or more sensors 2 of the sensor suite on the robotic system 10. This 3D volumetric reconstruction or point cloud information provides information relating to the environment of the at least one UAV. Optionally, the 3D volumetric reconstruction information may contain accumulative reconstruction information outside the field of view of the one or more sensors 2 of the sensor suite on the robotic system 10.

The virtual robotic system rendering is performed by receiving the ego state estimation information, manipulation system state information and, optionally, the attachment system state information from the robotic system 10. The ego state estimation is used to virtually place a virtual robotic system at the correct position and orientation relative to the workspace reconstruction map. The manipulation system state information and, optionally, the attachment system state information, which may be received in real-time from the robotic system 10, are used to determine the particular configuration/local motion of the virtual robotic system, such that the rendering of the virtual robotic system may be a direct representation of the robotic system 10. When generating a virtual robotic system model of at least part of the at least one robotic system in the environment, one or more of the manipulation system state information, the attachment system state information or other state information may be used to produce model that includes at least a part of at least one robotic system 10 (for example, at least one manipulator system) displayed in relation to the surroundings of the at least one robotic system 10.

The interactive robotic system simulation is performed by reconstructing the robotic model and kinematic models of the robot. The simulation may also include collision and other physical interactions against the objects in the VR scene, such as the point cloud received. By allowing the user 9 to interact with the model, for example grasping the end-effector or joints, the simulation model can be used for pre-execution exercise or sending one or more commands to the real robotic system 10. During a pre-execution exercise, a user 9 may choose to "detach" the simulation model from the physical manipulator system 5, so that(s) he can move the simulation model without sending commands to the physical manipulator system 5. By doing this, the user 9 is able to run a simulation test (which may include the simulation of some natural laws of physics) in virtual reality before executing the manipulator system 5. This may be referred to as pre-execution, in-situ or inline simulation. For example, a manipulator system 5 may be carrying a high power laser cutting tool, and a user 9 may want to test it in simulation and so get a feeling of whether it is going to cut anything behind the target before operating the physical manipulator system 5. This allows the safety and also the accuracy with which such remote operations can be conducted to be improved.

The workspace reconstruction rendering and/or virtual robotic system rendering may be determined/processed/performed on the operator interface controller, which may be comprised within the remote terminal 7. The virtual robotic system model, workspace reconstruction rendering and/or virtual robotic system rendering, having been processed, may be displayed to the user 9 to enable the user 9 to determine the real-time configuration of the robotic system 10 in relation to the environment of the robotic system 10. For example, the workspace reconstruction rendering and/or virtual robotic system rendering may be provided to the VR headset 1 and/or to a separate display screen. Thus, this information may be displayed to the user 9 by the VR headset 1 and/or the separate display screen. When the user 9 moves their head, the VR headset 1 detects the change in orientation and generates a user instruction which may be transmitted to the remote terminal 7 or directly to at least one robotic system 10. A command is then issued based on the received user instruction, which causes the at least one robotic system to respond in line with the user instruction. The position of the workspace reconstruction rendering and/or virtual robotic system rendering displayed on the VR headset 1 therefore changes accordingly. This enables a user 9 to accurately determine the real-time configuration of the robotic system 10 and its subcomponents in relation to the actual 3D environment of the robotic system 10. This enhances the decision-making capability of the user 9/operator of the system which enables remote operations to be performed with greater accuracy and greater reliability.

In one example, operational parameters, such as remaining endurance of the robotic system 10 or percentage of power remaining in the power unit 8, health status of one or more sensors and actuators and/or flight trajectory, can also be displaced visually by the VR headset 1 and/or the separate display screen.

The operator interface is configured to receive and/or generate user instruction using the VR headset 1 and one or more hand tracking devices 6 and optionally, other further input means, such as a keyboard or mouse too. By sending the user instruction received from the VR headset 1 and one or more hand tracking devices 6 to the remote terminal 7, a number of further operations perform may be performed, including: user perception and command interfacing.

The user perception is executed within the remote terminal 7 by receiving the six DoF position and orientation tracking information from the operator interface, which contains information about, for example, the user's 9 view point and rendering/displaying the stereo video for the VR headset 1 and optionally audio, based on the user's 9 view point relative to the workspace reconstruction map and configuration of the virtual robotic system. Optionally, the haptic information can be transmitted by the remote terminal 7 to the hand tracking device(s) 6, based on the state information from manipulation system on the robotic system 10, and this may further be in combination with the interaction between 3D reconstruction map and the virtual robotic system.

The command interfacing is executed within operator engine 7 by receiving six DoF position and orientation tracking and finger state information from at least one hand tracking device 6 carried by the user 9 (this information may be referred to collectively as user instruction or input data, although where input data is referred to it does not necessarily need to comprise all of the types of information identified above). The user 9 is able to utilise the motion of his hand(s) and finger(s) to generate user instruction which may then be sent to the robotic system 10, for example as one or more motion commands for one or more of the manipulation system 5, the attachment system 3 and the computing unit 11 of the robotic system 10, which may use this to generate manoeuvre waypoints for the robotic system 10. The user instruction may be used for the purpose of dexterity manipulation, to perform attachment manoeuvres and actions, and/or perform high level flight control and navigation.

The communication channel(s) between the robotic system 10 (or more than one robotic system 10) and the remote terminal 7 may be a direct point to point communication or, for example, may pass through central a cloud-based server, which can enable multiple client access. One example of a system layout for a cloud-based server scenario, is illustrated in FIG. 3.

Figure 3:
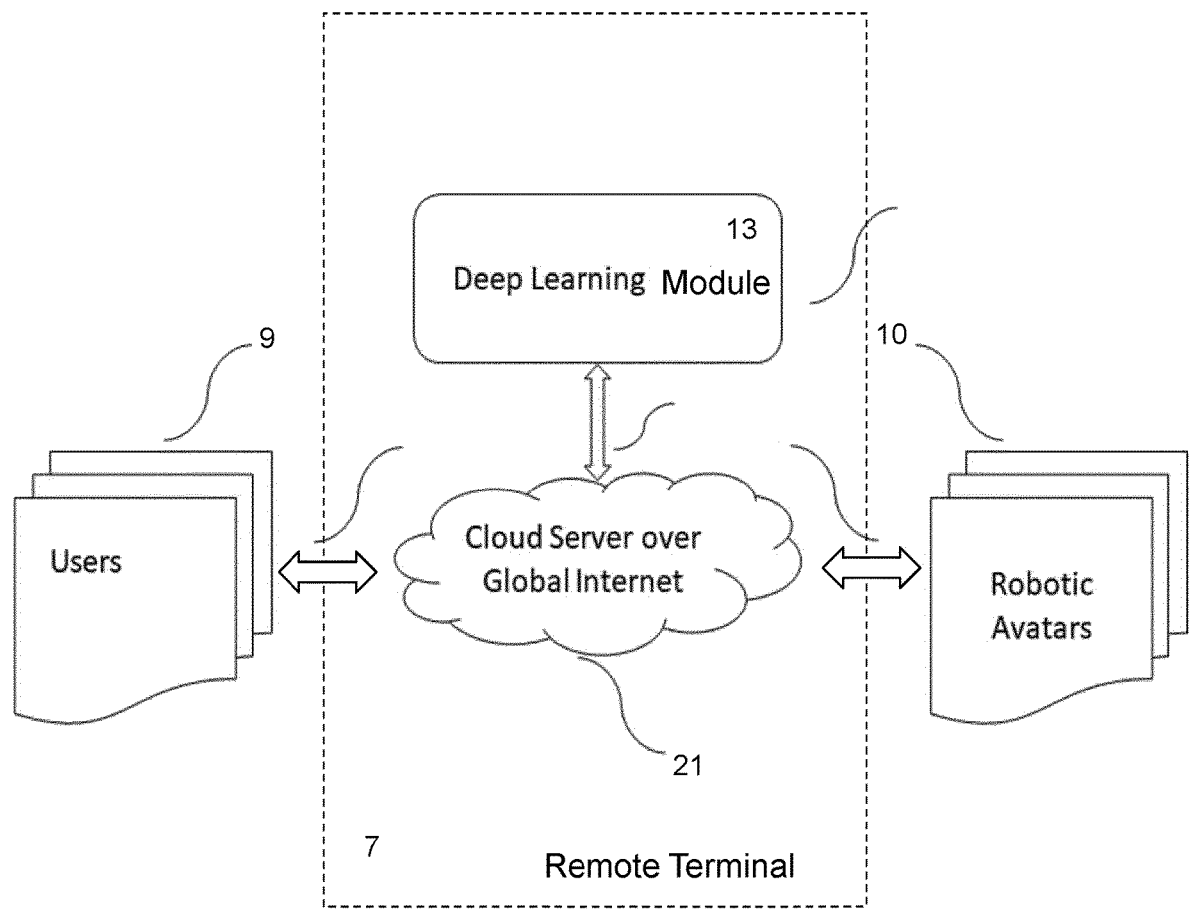
FIG. 3 depicts multiple users and multiple robotic systems communicating with a remote terminal that comprises a deep learning module.

FIG. 3 shows how multiple users 9 can access the cloud server 21 using virtual reality equipment, such as a VR headset 1 and hand tracking device(s) 6, which enables the users 9 to provide the user instruction(s) to the cloud server 21 and/or the remote terminal 7. The remote terminal 7 as shown in FIG. 3 comprises a cloud server 21 and a deep learning module 13. In some examples, the remote terminal 7 or a portion thereof is hosted within a cloud server 21. In other examples, the remote terminal 7 does not comprise the cloud server 21 but is in communication with the cloud server 21, which may perform one or more processing operations instead of the remote terminal 7 and/or store data for the remote terminal 7. The cloud server 21 is also configured to communicate with the deep learning module 13. In one example, the deep machine learning module 13 is comprised within the cloud server 21. In another example, the deep machine learning module 13 is comprised within the controller of the remote terminal 7. In another example, the deep machine learning module 13 is comprised within the one or more robotic systems 10.

One or more robotic systems 10 may also be configured to communicate with the cloud server 21. For example, the cloud server 21 may be configured to provide the user instruction, or a command derived from the user instruction, to a robotic system 10. For example, the robotic system 10 may be configured to provide assorted state and other information to the remote terminal 7 via the cloud server 21 or vice versa. The cloud server 21 can allow the remote terminal 7 to connect one user 9 to one robotic system 10, or one user 9 to multiple robotic systems 10, or multiple users 9 to one robotic system 10 or multiple users 9 to multiple robotic systems 10, depending on situation and/or user requirements.

The deep learning module 13 is configured to collect the massive user demonstration controller user instruction (also referred to as the user instruction or input data which may include the position and orientation of the headset, and/or the position, orientation and finger state of at least one hand controller) and data/information received from the one or more robotic systems 10. The data/information received from the one or more robotic systems 10 may comprise data generated by the one or more sensors 2 or data derived from the data generated by the one or more sensors 2, other sensor data and perception data (which may include volumetric mapping information, point cloud information, video stream information, robot ego state estimation, and/or robot manipulator joint information), while the one or more users 9 is/are controlling the robotic system(s) 10.

In one example, the deep learning module 13 then uses utilises deep imitation learning (which may include, but is not limited to, behavioural cloning, direct policy learning and inverse reinforcement learning), or another form of machine learning, to generalise an operation of the users 9. Deep imitation learning generalises the operation for controlling the robotic system(s) 10 to perform a particular manipulation task or other desired operation. Generalising a performance involves determining a set of instructions that will cause a robotic system 10 to repeat a particular operation. For example, this may be a complex manipulation task utilising a high level of dexterity. Humans possess natural manipulation instincts that it would be desirable for robotic systems to be able to replicate. Training computation may be inline, meaning that it occurs whilst the system is in operation (for example, while a task is being performed), or offline. Thus, the training may be a concurrent process that functions at the same time as the main task and can optionally record information in real-time. Once the inline or offline training computation has finished, the deep learning module 13 may then update the trained parameters of a neural network model.

In one example, the training may be deep imitation learning, which utilises a set of learning algorithms that may include behavioural cloning, direct policy learning and inverse reinforcement learning. In one example, there is the same neural network and deployment architecture setup between the robotic system 10 and the deep learning module/cloud training engine. The network parameter can then be trained in the cloud and directly downloaded to the robotic system 10. This can happen over system upgrade, commonly referred as Over-the-Air programming (OTA). The inline active neural network model can be hosted on the cloud server 21, or elsewhere on the operator interface 21, such as on the user VR equipment (which may refer to the VR headset 1, the one or more hand tracking devices 6, or both), or on the one or more robotic systems 10. The deep learning module 13 may also comprise a memory and may be configured to record the action of the user 9 and then merely command the robotic system 10 to repeat the same action.

The cloud server 21 may also enable the one or more users 9 to set a label to the data/information received from the one or more robotic systems 10 such as the sensor and/or perception data on the robotic system (referred to more generally as information). This may be done by fitting a virtual model to the information, or by enabling a user 9 to select a subset of the information (such as the generated data from the one or more sensors 2, a point cloud, a video stream or image), using the operator interface. For example, the user 9 can use the one or more hand tracking devices 6 to draw a 3D polygon to perform point cloud subset selection. A 2D polygon may also be used for image subset selection.

This data can also be sent to the deep learning module 13, which can execute training for object detection and tracking. This labelling process can be achieved while a user 9 is providing user instruction by performing a particular manipulation using the VR equipment. By tracking the motion of user's hand(s) and head and detecting the changes in the point cloud, the object of interest can be detected and a subset of the point cloud can then be labelled. For example, the subset of the point cloud for which a change has been detected may be labelled. Labelling sections of the point cloud for additional object detection and tracking is useful as a means of identifying targets. To do this, when a user is moving an object for example, if the point cloud for this object is a subset of the point cloud in the field of view, this subset may be identified by one or more of: moving with respect to the background; location within the field of view (for example, it may be in the centre of the field of view), having a predefined geometrical relationship with the user's 9 hand(s)/the one or more hand tracking devices 6). For example, for grasping an object, the object should be adjacent to the user's 9 hand(s)/the one or more hand tracking devices 6. Optionally, the trajectory of user's head and hand(s) can form a part of the data used to train a neural network to detect and track user's attempt. This enables the neural network to determine, for example, the type of task/operation, the target end position, and/or the target object. The neural network may be comprised within the deep learning module 13.

After the neural network model has been trained, the operator interface may then be configured to provide the user 9 with the option to activate an autonomous manipulation process for the robotic system 10 which uses the trained neural network model to send commands to the one or more robotic systems 10. In one example, the VR equipment is only used to give high level instructions to the robotic system(s) 10, such a target position, target object, target operations, and/or a required force or torque. In another example, the VR equipment is only used to supervise the operation of the robotic system 10 and/or takeover control when the robotic system 10 acts unexpectedly.

In another example, the user 9 may activate a 'hyper autonomy' mode, wherein the remote terminal 7 and/or the computing unit 11 combines input data/user instruction from the operator interface with commands provided by the machine learning module (for example trained neural network model). This enables the intuitive motion of the user 9 to be sent as a first manipulation command (user instruction/input data) that is then combined with a second manipulation command provided by the machine learning model which enables, for example, refinement of the imperfection of a user 9 command. In this mode, the user instruction from the user's 9 attempt to perform a particular operation or task is first detected by analysing the trajectory of the user's head and hand(s). Then, in one example, in case of low completion confidence of the neural network model, the manipulation system 5 and/or robotic system 10 is controlled to follow the hand trajectory to perform the operation. In another example, in case of high completion confidence of the neural network model, the manipulation system 5 and/or robotic system 10 is controlled to execute the task/operation according to the trained neural network model or other command received from the deep learning module 13.

This hyper autonomy mode enhances the capability of the system to perform assorted different operations. For example, the resulting effect may include diverting the manipulation system 5 around one or more obstacles that are not included within the user's 9 field of view. If an obstacle is within the sensors' 2 field of view such that the user 9 may be able to avoid the obstacle and provide the correct training data but the user is distracted and does not see the obstacle, then the system is configured to divert the manipulation system 5 around the obstacle by overriding the input from the user 9. In another example, the system may identify a particular task that the user 9 is attempting to perform, such as tightening a screw that needs tightening, and then override the input commands derived from the user instruction in the event that the user's hand is not steady when performing the task.

The wireless communications between the headset 1, the one or more hand tracking devices 6, the remote terminal 7, the robotic system 10 and/or the deep learning module 13 can be WiFi, Cellular LTE, 5G, or 2.4 GHz radio, 5 GHz radio or any form of mixture. In some examples there is also wireless communication between the remote terminal 7 and the operator interface. The wireless communication between these systems can be the same type of communication between all of the systems or can be different between the different systems.

The one or more manipulation systems 5 may be designed to be lightweight and strong. For example, these may be made from one or more of carbon fibre, carbon reinforced nylon, titanium, and onyx highly integration motor-driver-gear combo units. These may also utilise parallel mechanisms to maximise mechanical power efficiency.

The process described above augments the high degree of freedom of instructions that can be generated by the user 9 with automation intelligence of the robotic system 10 and/or a separate deep learning module 13, to facilitate seamless control and high dexterity manipulation of the robotic system 10.

The system(s) disclosed herein relate to a modular mobile robotic system 10, which may have a manipulation system 5 and various mobility options. Flying and attachment capabilities are two examples of the mobility options, but other mobility options are also envisaged. For example, the robotic system may be a rover (unmanned ground vehicle), may be configured to climb, may comprise legs, and/or may comprise omnidirectional wheels. For example, the manipulation system 5 and perception unit may be installed on a two wheel balancing robot, an omnidirectional rover, on a three wheel rover, on a four wheel rover, on a four legged robot, on another autonomous vehicles or on an autonomous railway inspection vehicle.

By providing an attachment module 3, the robotic system 10 is able to shut off power to the propulsion system 4 when the attachment module 3 is in use. This increases the efficiency and endurance capability of the robotic system 10 thereby enabling it to perform more operations or more complicated operations on a single charge.

Whilst at points the disclosure may refer to a single user 9 or a single robotic system 10, where practicable, it should be understood that there may be more than one user 9 and more than one robotic system 10.

Whilst the system shown in FIG. 1 utilises wireless communication the system may also use a wired connection. Similarly, the communication between the different modules/components/subsystems of the remote terminal 7 and robotic system 10 may communicate wirelessly or using a wired or other appropriate connection.

It should also be understood that the remote terminal 7, whilst illustrated as separate from the VR equipment such as the VR headset 1 in FIG. 1, may in fact comprise the VR equipment as a part of it so that the VR equipment communicates directly with the at least one robotic system 10. More generally, where the remote terminal 7 is referred to as performing a function, this may also be understood to mean that any of the sub-components/systems of the remote terminal 7 may also/instead perform this function. The virtual reality headset 1 can be a standalone controller or can connect to the remote terminal 7.

The computing unit 11 of the robotic system 10 is generally at least one CPU, but can also comprise a GPU or FPGA. Whilst the robotic system 10 described with reference to FIG. 1 is a UAV, it should be understood that the robotic system 10 may instead be a ground vehicle, such as an unmanned ground vehicle, a manned ground vehicle, an underwater vehicle such as an unmanned underwater vehicle, or some other vehicle. In these instances, the propulsion system 4 may not comprise an electric motor and corresponding propeller but may instead comprise one or more wheels. Where the system comprises more than one robotic system 10, each of these may be the same or different types of robotic vehicles.

Whilst in the examples above, processing has been described as happening on the robotic system 10 and the processed data/information being sent to the remote terminal 7, in some examples, the robotic system 10 may instead or as well transmit raw unprocessed data and some or all of the processing (such as creating the virtual robotic system model of at least part of the at least one robotic system in the environment/a 3D volumetric reconstruction) may occur at the remote terminal 7, for example, in the cloud server 21.

In the disclosure, the terms operation/remote operation/task may be used interchangeably and should be understood to have similar meanings.

Where the disclosure refers to the communication module or one or more communication devices 12 communicating with the remote terminal 7 or some component thereof, it should be understood that this has been instructed by the computing unit of the robotic system 10. Similarly, where the disclosure refers to the computer unit 11 or the robotic system 10 more generally communicating the remote terminal 7 or some component thereof, it should be understood that this is performed by the communication module or appropriate component thereof. Similarly, where the disclosure refers to the perception core module performing a particular function, this may also be understood to refer to a particular component or module of the perception core module, such as the computing unit 11 or communication device 12 performing that function, as appropriate. Similarly, where the disclosure refers to the robotic system 10 sending or receiving data, information or a command from the remote terminal 7, this may also refer to the robotic system 10 sending or receiving the data, information or command from any of the constituent parts of the remote terminal 7, such as the operator interface.

Figure 11:
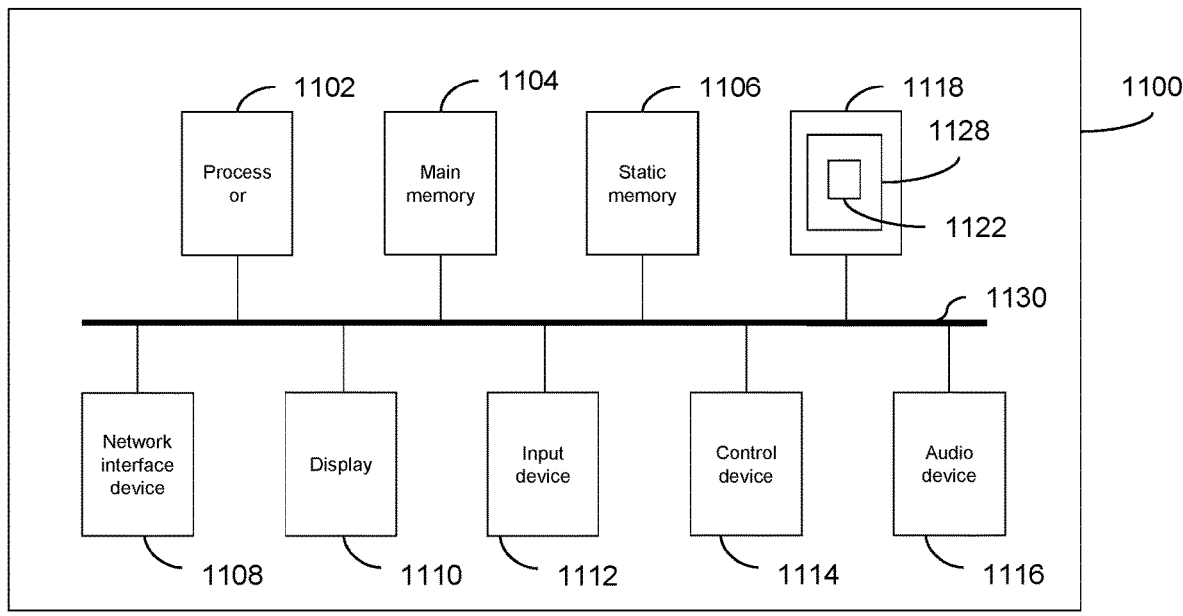
FIG. 11 illustrates a block diagram of one implementation of a computing device 1100 within which a set of instructions, for causing the computing device to perform any one or more of the methodologies discussed herein, may be executed.

FIG. 11 shows a block diagram of one implementation of a computing device 1100 within which a set of instructions, for causing the computing device to perform any one or more of the methodologies discussed herein, may be executed. The computing device 400 may form part of a device, apparatus, or system. In implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory (e.g., a data storage device 1118), which communicate with each other via a bus 1130.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the processing logic (instructions 1122) for performing the operations and steps discussed herein.

The computing device 1100 may further include a network interface device 1108. The computing device 1100 also may include a video display unit 1110 (e.g., a liquid crystal display (LCD) or a cathode ray tube (CRT)), an alphanumeric input device 1112 (e.g., a keyboard or touchscreen), a cursor control device 1114 (e.g., a mouse or touchscreen), and an audio device 1116 (e.g., a speaker). The network interface device 1108 may be located in the treatment room, or in another room. The network interface device 1108 may comprise a transmitting unit and/or a receiving unit. For example, the network interface device 1108 may comprise a transceiver configured to transmit and receive data. The network interface device 1108 may be configured to receive data, e.g. from a sensor.

The data storage device 1118 may include one or more machine-readable storage media (or more specifically one or more non-transitory computer-readable storage media) 1128 on which is stored one or more sets of instructions 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting computer-readable storage media.

Figure 12:
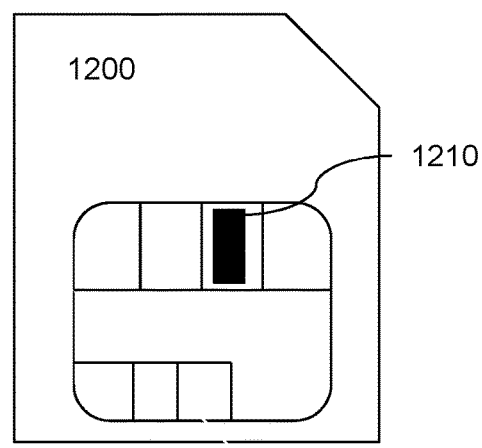
FIG. 12 illustrates a computer-readable medium.

The various methods described above may be implemented by a computer program. The computer program may include computer code arranged to instruct a computer to perform the functions of one or more of the various methods described above. The computer program and/or the code 1210 for performing such methods may be provided to an apparatus, such as a computer, on one or more computer readable media or, more generally, a computer program product, depicted in FIG. 12. The computer readable media 1200 may be transitory or non-transitory. The one or more computer readable media 1200 could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media 1200 such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

The above implementations have been described by way of example only, and the described implementations and arrangements are to be considered in all respects only as illustrative and not restrictive. The different examples described may be combined in any suitable manner. Furthermore, where systems are described as being configured to perform assorted functions, it should also be understood that there is a corresponding method for using the systems in the manner for which they are configured is also implicitly disclosed. It will be appreciated that variations of the described implementations and arrangements may be made without departing from the scope of the invention.

The invention claimed is:

1. A method for controlling an operation of at least one robotic system, the method comprising:
   receiving state information from the at least one robotic system in an environment;
   processing the state information to generate a virtual robotic system model of at least part of the at least one robotic system in the environment;
   causing a visualization of the virtual robotic system model to be displayed to at least one user;
   receiving a user instruction for performing an operation while the visualization is being displayed to the at least one user;
   issuing a command based on the user instruction to the at least one robotic system to cause the at least one robotic system to perform the operation;
   detecting first changes in the user instruction over a period of time;
   detecting second changes in the state information over the period of time; and
   using the first changes and the second changes to identify an object of interest.

2. The method of claim 1, further comprising further causing the visualization of the virtual robotic system model to be displayed to the at least one user on an operator interface for performing position tracking and/or orientation tracking of at least one part of the at least one user.

3. The method of claim 1, wherein the state information comprises at least one of: 3D volumetric information, 3D structural and color information, point cloud information, manipulation system state information, haptic information, or ego state estimation information, and wherein the ego state estimation information comprises one or more of a position or an orientation of the at least one robotic system in relation to the environment.

4. The method of claim 1, further comprising:
   processing the state information to generate robotic system data; and
   causing the robotic system data to be displayed to the at least one user.

5. The method of claim 1, wherein the state information comprises User Datagram Protocol packages of data compressed using an image-based lossy compression method.

6. The method of claim 5, wherein processing the state information comprises:
   decompressing the User Datagram Protocol packages of data with a hardware accelerated decompression engine to produce an RGB image and a depth image; and
   decoding the depth image to obtain a decoded depth image,
   wherein generating the virtual robotic system model comprises using the RGB image and the decoded depth image.

7. The method of claim 1, further comprising:
   processing the state information received from the at least one robotic system and the user instruction to determine generalized operation instructions for a repeatable performance of the operation; and
   determining the command issued to the at least one robotic system using the generalized operation instructions.

8. The method of claim 7, further comprising using imitation learning to process the state information received from the at least one robotic system and the user instruction to determine the generalized operation instructions.

9. The method of claim 8, wherein the imitation learning comprises:
   training a neural network; and
   updating one or more training parameters of the neural network.

10. The method of claim 7, wherein determining the generalized operation instructions is performed within a cloud server.

11. The method of claim 1, wherein the command issued to the at least one robotic system is a repeat of a previous command.

12. The method of claim 1, further comprising:
using the state information to perform an interactive robotic system simulation that is caused to be displayed to the user and that comprises reconstructing the virtual robotic system model and kinematic models of the robotic system; and
receiving a user interaction with the interactive robotic system simulation,
wherein the user instruction is based on the user interaction with the interactive robotic system simulation.

13. The method of claim 12, further comprising performing a pre-execution exercise before issuing the command.

14. The method of claim 1, wherein at least one of the at least one robotic system comprises at least one manipulation system, and wherein performing the operation comprises operating the at least one manipulation system.

15. The method of claim 1, wherein at least one of the at least one robotic system is a mobile vehicle.

16. The method of claim 1, further comprising:
causing the visualization of the virtual robotic system model to be displayed to at least two users; and
receiving the user instruction for performing the operation from the at least two users.

17. The method of claim 1, further comprising:
transmitting state information by at least two robotic systems; and
receiving the command by the at least two robotic systems to cause the at least two robotic systems to perform the operation.

18. The method of claim 1, wherein at least one of the at least one robotic system is an unmanned aerial vehicle.

19. The method of claim 1, further comprising:
labelling the object of interest to obtain a labelled object of interest;
receiving a second user instruction for performing the operation, wherein the second user instruction comprises a selection of the labelled object of interest by the user; and
issuing a second command based on the second user instruction to the at least one robotic system to cause the at least one robotic system to perform the operation.

20. A remote terminal for at least one robotic system and comprising:
a memory configured to store instructions; and
a processor coupled to the memory and configured to execute the instructions to cause the remote terminal to:
receive state information from the at least one robotic system in an environment;
process the state information to generate a virtual robotic system model of at least part of the at least one robotic system in the environment;
cause a visualization of the virtual robotic system model to be displayed to at least one user;
receive a user instruction for performing an operation while the visualization is being displayed to the at least one user;
issue a command based on the user instruction to the at least one robotic system to cause the at least one robotic system to perform the operation:
detect first changes in the user instruction over a period of time;
detect second changes in the state information over the period of time; and
use the first changes and the second changes to identify an object of interest.

\* \* \* \* \*